(12) United States Patent
Kim et al.

(10) Patent No.: US 6,954,491 B1
(45) Date of Patent: Oct. 11, 2005

(54) METHODS AND SYSTEMS FOR SENDING SIDE-CHANNEL DATA DURING DATA INACTIVE PERIOD

(75) Inventors: Gyudong Kim, San Jose, CA (US); Min-Kyu Kim, Cupertino, CA (US)

(73) Assignee: Silicon Image, Inc., Sunnyvale, CA (US)

( * ) Notice: Subject to any disclaimer, the term of this patent is extended or adjusted under 35 U.S.C. 154(b) by 768 days.

(21) Appl. No.: 09/881,271

(22) Filed: Jun. 14, 2001

(51) Int. Cl.$^7$ .............................................. H04L 5/16
(52) U.S. Cl. ..................... 375/220; 375/222; 375/260; 370/278; 370/282; 370/468; 370/536
(58) Field of Search ................................ 375/219, 220, 375/222, 257, 259, 260; 370/278, 280, 282, 370/294, 321, 347, 442, 468, 535–537; 348/460–469, 348/473, 476–478

(56) References Cited

U.S. PATENT DOCUMENTS

| | | | |
|---|---|---|---|
| 5,483,534 A | * | 1/1996 | Ohki et al. .................. 370/535 |
| 5,828,786 A | | 10/1998 | Rao et al. |
| 5,974,464 A | | 10/1999 | Shin et al. .................. 709/231 |
| 6,167,077 A | * | 12/2000 | Ducaroir et al. ............ 375/219 |
| 6,219,357 B1 | | 4/2001 | Ishikawa |

* cited by examiner

Primary Examiner—Dac V. Ha
(74) Attorney, Agent, or Firm—Perkins Coie LLP

(57) ABSTRACT

The present invention relates to a serial interface transmission system with more than one data line, in which the transmitted data has in-band and out-of-band characters. More particularly, the present invention relates to methods and systems for sending side channel data over a high-speed digital communications link, e.g., a video link. One embodiment of the invention provides a high-speed digital transmitter capable of sending side channel data. The transmitter includes a channel zero encoder, a multiplexer, data enable out ($DE_{out}$) control logic, and a channel one encoder. The channel one encoder receives input from the channel one multiplexer and the channel one $DE_{out}$ control logic. Another embodiment of the invention provides a high-speed digital receiver capable of receiving side channel data. The receiver includes a channel zero decoder, a channel one decoder, DEI signal and FIFO control signal recovery logic, and a channel one de-multiplexer. The DEI signal and FIFO control signal recovery logic receives input from the channel one decoder. Similarly, the channel one demultiplexer receives input from the channel one decoder.

27 Claims, 14 Drawing Sheets

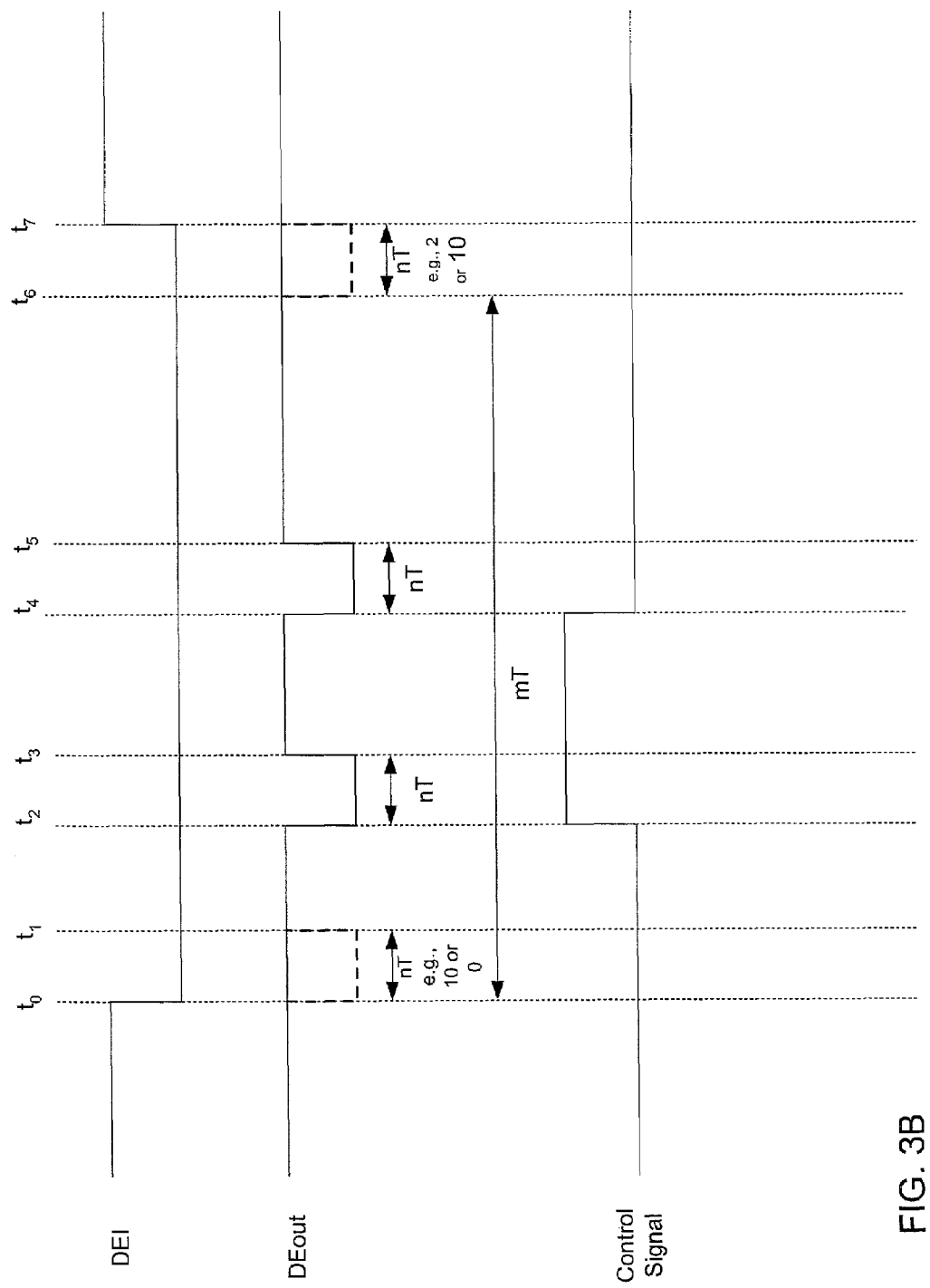

METHODS AND SYSTEMS FOR SENDING SIDE-CHANNEL DATA DURING DATA INACTIVE PERIOD

BACKGROUND OF THE INVENTION

1. Field of the Invention

The present invention relates to a serial interface transmission system that is designed for transmitting over more than one data line and that encodes content data and data enable signal data using in-band and out-of-band characters. More particularly, the present invention relates to methods and systems for sending side channel data over a high-speed digital communications link, e.g., a video link.

2. Description of the Background

The sending of data over a high-speed digital communication link, such as a video link, often involves the encoding of data as in-band and out-of-band characters. Encoding of data as in-band and out-of-band characters is described in detail in U.S. Pat. No. 5,974,464 issued Oct. 26, 1999, entitled "System for High Speed Serial Video Signal Transmission Using DC-Balanced Coding," and incorporated herein by reference in its entirety. Examples of such encoding schemes include transition minimized differential signaling (TMDS) and Byte oriented DC balanced 8B/10B partitioned block transmission code, as described in U.S. Pat. No. 4,486,739, issued Dec. 4, 1984, and incorporated herein by reference in its entirety. Thus, TMDS is only one example of such an encoding scheme.

The digital visual interface (DVI) specification, which is based on TMDS, is a standard for an all-digital display solution. The DVI specification [online], Apr. 2, 1999 [retrieved on Apr. 18, 2001], retrieved from the Internet: <URL:http://www.ddwg.org/register/index.php3>, is incorporated herein by reference in its entirety. Thus, one example of the above-referenced serial interface is a DVI 1.0 compliant communication link. Such a communication link does not make full use of the link's bandwidth during data inactive periods. The fact that such a communication link does not make full use of the link's bandwidth is noteworthy because there is a need to send side channel data, such as text, audio, still images, picture-in-picture, caption, data link configurations, and checksum, or other system control data, over such a link.

Expanding on the point of making full use of a link's bandwidth during data inactive periods, a TMDS transmission system typically includes more than one encoder and each encoder encodes 8-bits of video data, a data enable (DE) signal, and 2 bits of control signals. Thus, the encoders transmit all data and control signals. Stated another way, a TMDS link typically has four pairs of signal wires. One pair sends clock signals, the other three pairs send data signals. The three data pairs send video data and special characters. The special characters represent control signals and the DE signal is defined by the encoding. The three data pairs are termed channels 0, 1, and 2. The TMDS transmitter encodes the video data and the special characters as 10-bit DC-balanced encoded data. The TMDS coding scheme is described in the above-noted U.S. Pat. No. 5,974,464, entitled "System for High Speed Serial Video Signal Transmission Using DC-Balanced Coding", and incorporated herein by reference in its entirety.

One can separate a video signal stream from a control signal stream, both of which are sent over each of the channels, using the polarity of a data enable in (DEI) signal. When the DEI signal is asserted, the transmitter sends video data. In one embodiment, the TMDS transmitter sends video data at the rate of eight bits per clock per channel. When the DEI signal is de-asserted, the TMDS transmitter sends special characters that represent both control signals and the DEI signal. In one embodiment, the TMDS transmitter sends special characters at the rate of 2 bits per clock per channel. The two bits of data per clock per channel sent out when DEI is de-asserted relate to control signals as follows: in channel 0—Hsync and Vsync; in channel 1—control 0 and control 1; and in channel 2—control 2 and control 3. Thus, the TMDS system sends six bits of information per clock through three channels.

TMDS transmitters send different data and different control signals across each channel. However, current TMDS transmitters send the same DE signal for all three channels, creating a redundancy. Thus, such DVI 1.0 compliant communication links do not make full use of the link's bandwidth during data inactive periods. As noted above, the fact that such a communication link does not make full use of the link's bandwidth is noteworthy because there is a need to send side channel data over such a link.

The simplest way to send side channel information over a high-speed communication link is to utilize the blanking period without modifying the link's transmitter and receiver. However, this method is not physically compatible with a legacy link that is not prepared for such a data stream because the legacy link would interpret the side data stream as part of a valid video stream, jeopardizing the integrity of the video stream.

Another way to send side channel data is to modulate the unused, e.g., falling, edge of the clock signal. This method is discussed in U.S. patent application Ser. No. 09/393,235, entitled "A System and Method For Sending and Receiving Data Signals Over a Clock Signal Line, and incorporated herein by reference in its entirety. However, this method is not the only way to send side channel data and there remains a need for other methods that can be used alone or along with the method of modulating the falling edge of the clock signal.

Thus, a need exists for a system that exploits the robustness of existing serial interface receivers, e.g., TMDS receivers, to transfer side channel data during data inactive periods. A need exists for a system that can transfer side channel data and maintain compatibility with existing devices. A need exists for a system that takes advantage of the redundancy created by sending the same DE signal for multiple channels. These needs exist not only for communication links that use TMDS but also, more generally, for high-speed serial interface transmission systems that have more than one data line and that encode content data and data enable signal data using in-band and out-of-band characters.

SUMMARY OF THE INVENTION

The present invention, which relates to serial interfaces capable of sending side channel data during data inactive periods, satisfies the needs described above. One embodiment of the invention provides a high-speed digital transmitter capable of sending side channel data. The transmitter includes a channel zero encoder, a multiplexer, data enable out ($DE_{out}$) control logic, and a channel one encoder.

The channel zero encoder has first and second inputs and an output. The first input receives channel zero primary data. The second input receives a channel zero $DE_{out}$ signal, and the output produces channel zero encoded data. The channel zero encoder produces channel zero encoded data based at least in part on the channel zero primary data and the channel zero $DE_{out}$ signal.

The channel one multiplexer has at least first and second data inputs, at least one control input, and at least one output. The channel one multiplexer multiplexes channel one primary data and channel one side channel data. The first data input receives channel one primary data. The second data input receives channel one side channel data. The control input receives a Data enable in (DEI) signal, and the output provides a multiplexed signal including channel one side channel data and channel one primary data.

Channel one $DE_{out}$ control logic has a first input and an output. The channel one $DE_{out}$ control logic produces a channel one $DE_{out}$ signal for facilitating the transfer of channel one side channel data. The first input receives a DEI signal, and the output produces a channel one $DE_{out}$ signal.

The channel one encoder has first and second inputs and an output. The first input receives the output of the channel one multiplexer. The second input receives the output of the channel one $DE_{out}$ control logic. The output produces channel one encoded data. The channel one encoder produces channel one encoded data based at least in part on the first and second inputs.

Another version of the invention provides a high-speed digital receiver capable of receiving side channel data. The receiver includes a channel zero decoder, a channel one decoder, DEI signal and FIFO control signal recovery logic, and a channel one demultiplexer.

The channel zero decoder has a first input and first and second outputs. The first input receives channel zero encoded data. The first output produces a channel zero decoded data signal. The second output produces a channel zero $DE_{out}$ signal. The channel zero decoder produces channel zero decoded data and a channel zero $DE_{out}$ signal from the channel zero encoded data.

The channel one decoder has at least an input and first and second outputs. The first input receives channel one encoded data. The first output produces channel one decoded data. The second output produces a channel one $DE_{out}$ signal. The channel one decoder produces channel one decoded data and a channel one $DE_{out}$ signal from the channel one encoded data.

The DEI signal and FIFO control signal recovery logic has first and second inputs and first and second outputs. The first input receives the channel zero $DE_{out}$ signal. The second input receives the channel one $DE_{out}$ signal. The DEI signal and FIFO control signal recovery logic derives a DEI signal from the channel one $DE_{out}$ signal and the channel zero $DE_{out}$ signal. The first output produces a DEI signal, the second output produces a first FIFO control signal.

The channel one de-multiplexer has a data input, a control input, and first and second outputs. The channel one de-multiplexer separates channel one decoded data into channel one primary data and channel one side channel data. The data input receives channel one decoded data from the channel one decoder. The control input receives the DEI signal from the DEI signal and FIFO control signal recovery logic. The first output produces channel one side channel data, and the second output produces channel one primary data.

The invention also provides a method for sending side channel data during a data inactive period. The method includes: a) encoding channel zero primary data, and DEI data as in-band and out-of-band characters for transmission on channel zero; b) deriving a channel one DEout signal for facilitating the transfer of channel one side channel data using channel one $DE_{out}$ control logic having one input and one output, the first input receiving a DEI signal, and the output producing a channel one $DE_{out}$ signal; and c) encoding channel one primary data, channel one side channel data, and $DE_{out}$ signal data using in-band and out-of-band characters for transmission on channel one.

The invention further provides a method for receiving side channel data. The method includes receiving channel zero encoded data and channel one encoded data. The method includes decoding channel zero encoded data using a channel zero decoder having a first input and first and second outputs. The first input receives channel zero encoded data. The first output produces a channel zero decoded data signal. The second output produces a channel zero $DE_{out}$ signal.

The method includes decoding channel one encoded data using a channel one decoder having at least an input and first and second outputs. The first input receives channel one encoded data. The first output produces channel one decoded data. The second output produces a channel one $DE_{out}$ signal.

The method derives a DEI signal using DEI signal and FIFO control signal recovery logic having first and second inputs and first and second outputs. The first input receives the channel zero $DE_{out}$ signal. The second input receives the channel one $DE_{out}$ signal. The first output produces a DEI signal. The second output produces a first FIFO control signal.

In addition, the method includes separating channel one decoded data from channel one side channel data using a channel one de-multiplexer having a data input, a control input, and first and second outputs. The data input receives channel one decoded data from the channel one decoder. The control input receives the DEI signal from the DEI signal and FIFO control signal recovery logic. The first output produces channel one side channel data, and the second input produces channel one primary data.

BRIEF DESCRIPTION OF THE DRAWINGS

The teachings of the present invention can be readily understood by considering the following detailed description in conjunction with the accompanying drawings. The drawings are not necessarily drawn to scale.

FIG. 3B illustrates input and output signals for the $DE_{out}$ control logic of FIG. 3A.

DETAILED DESCRIPTION OF THE EMBODIMENTS

Figure 1:
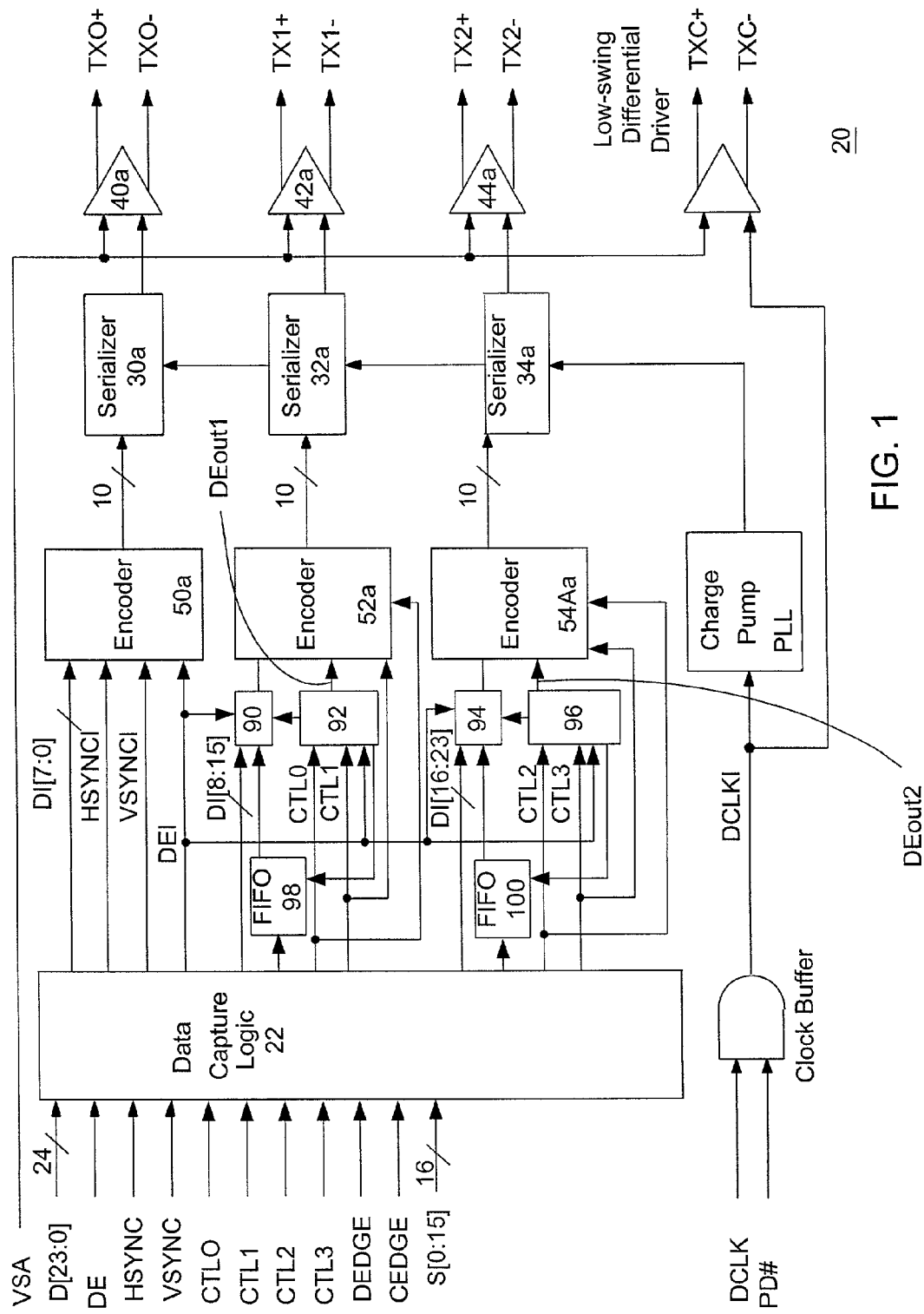
FIG. 1 is a description of one embodiment of a transmitter according to the present invention.

The present invention will now be described with respect to different embodiments. For each embodiment, like reference numerals and acronyms are used to indicate like parts with the same or similar functionality for ease of understanding and convenience. The present invention is described in the context of a transition-minimized differential signaling (TMDS) link. However, the present invention relates generally to serial interface transmission systems with more than one data line, where the transmission system encodes content data (including primary data) and data enable signal data using in-band and out-of-band characters and the primary data flow is not continuous.

The simplest way to send side channel data over a high-speed digital communication link is to utilize the blanking period without modifying the link's transmitter and receiver. However, this method is not physically compatible with a legacy link that is not prepared for such side channel data because the legacy link would interpret the side channel data as part of the primary, e.g., video, data, jeopardizing the integrity of the primary data. Moreover, to increase bandwidth further in the blanking period, a transmission system could encode the activity of control signals, e.g., the Hsync and Vsync pulses, and use the rest of the blanking period for sending side channel data. But this method reduces the flexibility of the data link over erratic—in other words, non-regular—or non-standard video modes such as exist in a double layer supertwist nematic (DSTN) display.

To expand on this last point, the assumption that a blank period starts at some fixed point and ends at some other fixed point is not always correct. For example, if one encodes the data for the side channel assuming that the data enable (DE) signal will rise at time T but then the DE signal rises at T-1, the receiver will mistakenly expect that up to the time T the data is side channel data and not video data. Erratic video modes are commonly encountered. Thus, a limited amount of error has to be tolerated in a transmission system that also transfers data using the data inactive period.

Even more aggressive encoding could be attempted if one encodes the location of transitions in Hsync and Vsync. Since the Hsync and Vsync signals are generally predictable, one might consider sending only the timings of these signals rather than sending the signals themselves. However these seemingly periodic and predictable signals can lose their periodicity and predictability as a result of design imperfections or for other reasons. For example, in some video scrambling methods, these sync signals are scrambled such that the behavior of these signals becomes unpredictable. Such unpredictable sync signals can degrade the security of a video transmission or they can degrade the signal integrity of the video transmission itself.

Stated differently, sending side channel data by sending only the timings of the Hsync and Vsync signals assumes a certain waveform, e.g., the number of pulses within a given period and the polarity of the waveform. This assumption may not hold when the specific video mode is not considered in the design phase. For example, a system that encodes only one pulse of Vsync cannot support a DSTN display because a DSTN display could require two Vsync pulses in a single Vsync blanking period. Hence, there are many reasons why the methods described above may not work.

In contrast, methods according to embodiments of the invention preserve sync signal locations as if the side channel does not exist. As noted above, the present invention relates generally to serial interface transmission systems designed for transmitting over more than one data line, where the transmission system encodes content data (including primary data and side channel data) and data enable signal data using in-band and out-of-band characters and where the primary data flow is not continuous. Also as noted above, embodiments of the invention transmit the side channel data by exploiting part of the blanking period. The blanking period occurs when the primary data flow is temporarily stopped. However, exploiting part of the blanking period affects the integrity of the received primary data. During the blanking period, the receiver receives out-of-band characters that provide timing information. The receiver uses the timing information to estimate an optimal sampling location. The estimation is, ideally, an averaging process to reduce any high frequency disturbance in the form of jitter.

Since a blanking interval is a finite length, the estimation contains statistical variation. The standard statistical deviation reduces as the sample size, i.e., the length of the blanking interval in question, increases. More specifically, the standard deviation is inversely proportional to the square root of the sample size if the perturbations are independent of each other and identical.

Transmission systems often use this estimated optimal sampling point as the sampling point for the data period that follows the blanking period. Deviation from the optimal sampling point increases the bit error rate (BER). Thus, the standard deviation of the estimated sampling point dictates the BER, assuming an ideal receiver architecture. In other words, the estimation of the optimal sampling point relates the length of the blanking period to the BER. However, if a transmission system has some margin in the BER it provides relative to the maximum BER allowed by the Digital Visual Interface (DVI) 1.0 specification, the system can use some of the blanking period to send side channel data thereby shortening the blanking period. In other words, the system can reduce the blanking period to a level that keeps the BER below the maximum rate allowed by the specification and can utilize the left over bandwidth to transfer side channel data. Since many factors affect the BER, a transmission system can dynamically determine the configuration of this side channel from a diagnosis of the link quality. Furthermore, the transmission system can assign the most reliable channel to carry the most prized data, e.g., the DEI signal.

The present invention provides system and methods for transmitting side channel data over a high-speed digital communications link during the data inactive period. FIG. 1 shows a functional block diagram of one embodiment of the transmitter of the present invention. Designers can implement the transmitter of FIG. 1 as an integrated circuit. The illustrated embodiment is a video link transmitter 20 and includes a data capture logic block 22, a plurality of data encoders 50A, 52A, 54A, a plurality of serializers 30a, 32a, 32b, a plurality of high-speed channel drivers 40a, 42a, 44a and a clock generator whose typical embodiment is a PLL or a DLL. The transmitter 20 transmits clock signals on a separate channel.

Figure 4:
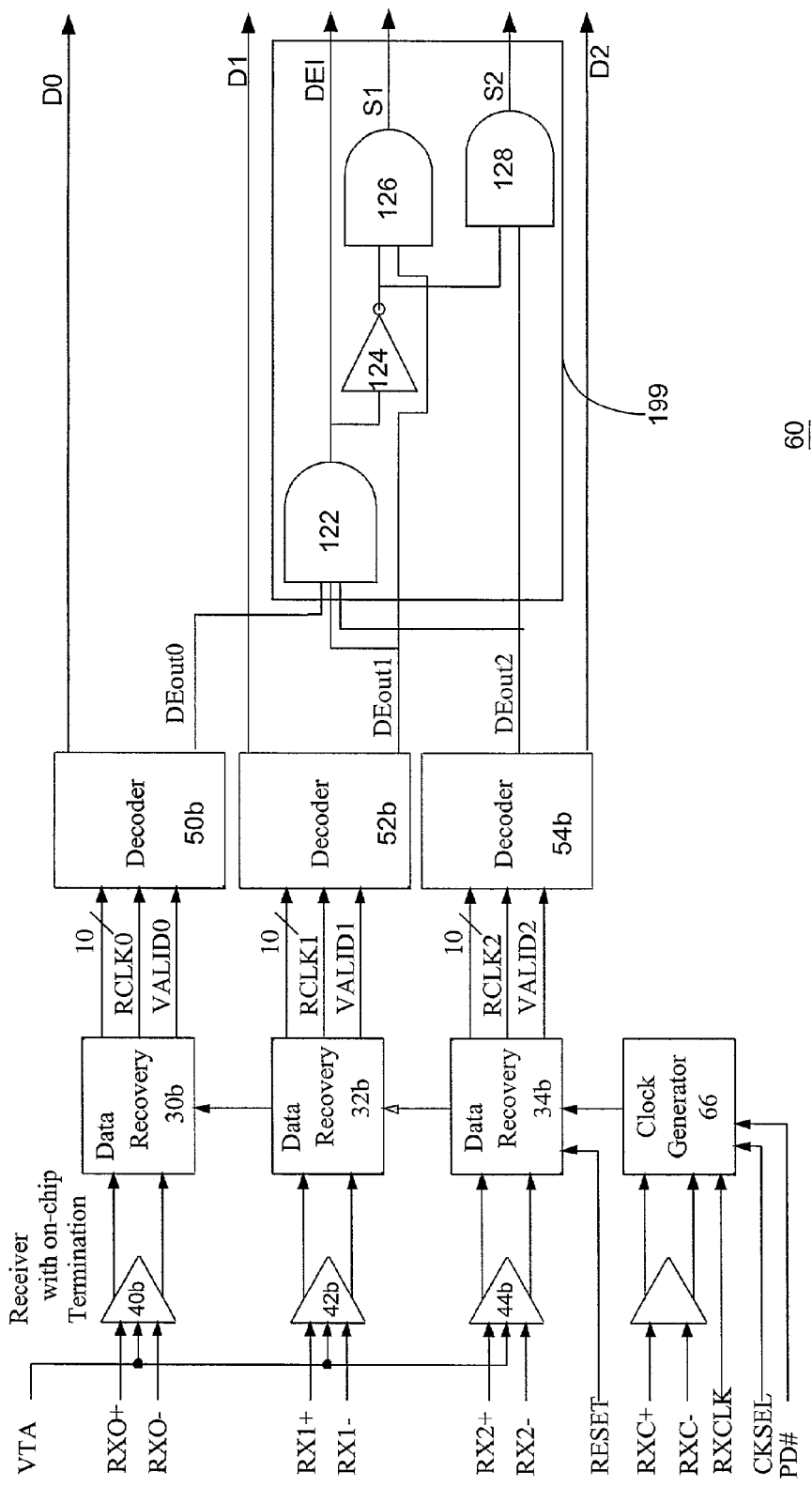
FIG. 4 illustrates one embodiment of a receiver according to the present invention.

FIG. 4 shows a functional block diagram of one embodiment of a receiver 60 in accordance with the present invention. The illustrated embodiment is a video link receiver 60. The video link receiver 60 includes a plurality of differential receiver circuits 40b, 42b, 44b, a plurality of data recovery modules 30b, 32b, 34b, and a plurality of decoders 50b, 52b, 54b. The receiver 60 further includes panel interface logic (not shown) for receiving decoded data. The receiver 60 includes a clock generator 66 such as a phase locked loop (PLL) or a DLL for providing clock signals necessary for data recovery. Although the transmitter and receiver are illustrated as having three data channels, those of skill in the art will appreciate that the present invention is also applicable to links with two channels and to links with more than 3 channels.

Returning to FIG. 1, as noted above, each encoder unit 50a, 52a, 54a encodes 8-bits of video data, data enable (DE), and 2 bits of control signals. Thus, the encoders transmit all data and control signals. Examples of coding schemes that can be used by the encoders of FIG. 1 are described in the above-noted U.S. Pat. No. 5,974,464, entitled "System for High Speed Serial Video Signal Transmission Using DC-Balanced Coding," and incorporated herein by reference in its entirety. U.S. Pat. No. 5,974,464 also described embodiments of the encoders, serializers, and channel drivers of FIG. 1 and embodiments of the receiver circuits, data recovery modules and decoders of FIG. 4.

One can separate a primary, e.g., video, signal stream from a control signal stream, both of which are sent over each of the channels, using the polarity of a data enable in (DEI) signal. When DEI is asserted, the transmitter sends primary data. In one embodiment, the TMDS transmitter sends primary data at the rate of eight bits per clock per channel. When DEI is not asserted, the TMDS transmitter sends special characters that represent both control signals and the DEI signal. In one embodiment, the TMDS transmitter sends special characters at the rate of 2 bits per clock per channel. The two bits of data per clock per channel sent out when DEI is not asserted relate to control signals as follows: in channel 0—Hsync and Vsync; in channel 1—control 0 and control 1; and in channel 2—control 2 and control 3. Thus, the TMDS system sends six bits of information per clock through three channels.

TMDS transmitters send different data and different control signals across each channel. However, current TMDS transmitters send the same DE signal for all three channels, creating a redundancy. Thus, one embodiment of a TMDS system according to the invention can send an unaltered DE signal on one channel and can send altered DE signals on the other channels to allow the transmission of side channel data. For example, assume that, for a period during which the DEI is not asserted, the DE signal for channel 0 is also not asserted. Also, assume for this same DEI blank period that either one or both of the DE signals for channels 1 and 2, $DE_{out}1$ and $DE_{out}2$, are asserted at certain times. One can define $DE_{out}$ as the DE signal received by the encoder, e.g., 50A, 52A, 54A. Further, assume that the TMDS transmitter transmits DEI over channel 0 and the receiver uses the DE signal encoded on channel 0 to recover DEI. As a result, when the DE signal for channel 0 is not asserted, the recovered DEI remains not asserted, e.g., low, even though the DE signals on channels 1 and 2, $DE_{out}1$ and $DE_{out}2$, are at times asserted, e.g., high. The receiver can recover DEI by using an AND gate having the $DE_{out}$ signals from each channel as inputs.

More generally, if the TMDS system maintains at least one channel's $DE_{out}$ signal as low when DEI is low, then the system can send data using the $DE_{out}$ signals of the other channel or channels. In other words, if the transmitter sends special characters as the DEI signal, the receiver reads the received signal as indicating a data inactive or blank period. If the transmitter sends other than special characters, the receiver reads the received signal as indicating a data active or non-blank period. During a data active period, the receiver retrieves primary content data. Thus, a properly designed transmitter can send special characters (e.g., out-of-band characters) over one channel and side channel data (e.g., in-band characters) over the other channel or channels during a DEI blank period. As long as one channel has a $DE_{out}$ signal that is de-asserted when DEI is blank, the transmitter can send side channel data over the other channel or channels, e.g., over two of the three data channels in the three data channel example.

In addition, given a properly designed transmitter, legacy receivers continue to operate normally because such receivers are able to recover a final DEI that reflects the transmitted DEI. Legacy receivers recover a final DEI that reflects the transmitted DEI because legacy receivers use an AND gate that takes as inputs the DE signals received from the decoders and produces as output the final DEI.

However, there are considerations that impact a designer's use of $DE_{out}$ signals in sending side channel data. More specifically, the video electronics standards association (VESA) provides specifications for the $DE_{out}$ signals sent over each TMDS channel. These specifications help maintain interoperability of new transmitters and receivers with legacy transmitters and receivers.

The VESA specifications address a number of issues including the following. TMDS receivers perform phase tracking or byte alignment, which operates best when there are at least ten clocks of continuous data inactive period either at the beginning or at the end of an entire data inactive period. In addition, TMDS receivers perform inter-channel synchronization in an attempt to compensate for differences in delays between the channels. The last rising edge of the DEI signal in each channel triggers inter-channel synchronization logic applied to each channel. As a result, the $DE_{out}$ signal can take at least two forms: 1) Unaltered for ten clock cycles after DE falling edge (for phase tracking) and for two clock cycles before DEI rising edge (for channel synchronization); 2) No restrictions after DEI falling edge and unaltered for ten clock cycles before DE rising edge (for both phase tracking and channel synchronization). In addition, the DEout signal should be low for at least one clock following the rising or falling edges of a control signal.

With reference to FIG. 3B (not drawn to scale), according to the first form of the $DE_{out}$ signal, TMDS systems should not alter the DEI signal for at least ten clocks after DEI falling edge and for at least two clocks prior to DEI rising edge. In other words, the TMDS system should continue to use special characters for certain periods around the edges of the DEI signal. Finally, the $DE_{out}$ signal should be de-asserted for at least one clock following the rising or falling edges of a control signal. According to the second form of the $DE_{out}$ signal, TMDS systems should not alter the DEI signal for at least ten clocks prior to DEI rising edge and the DE signal should be de-asserted for at least one clock following the rising or falling edges of a control signal.

Figure 2:
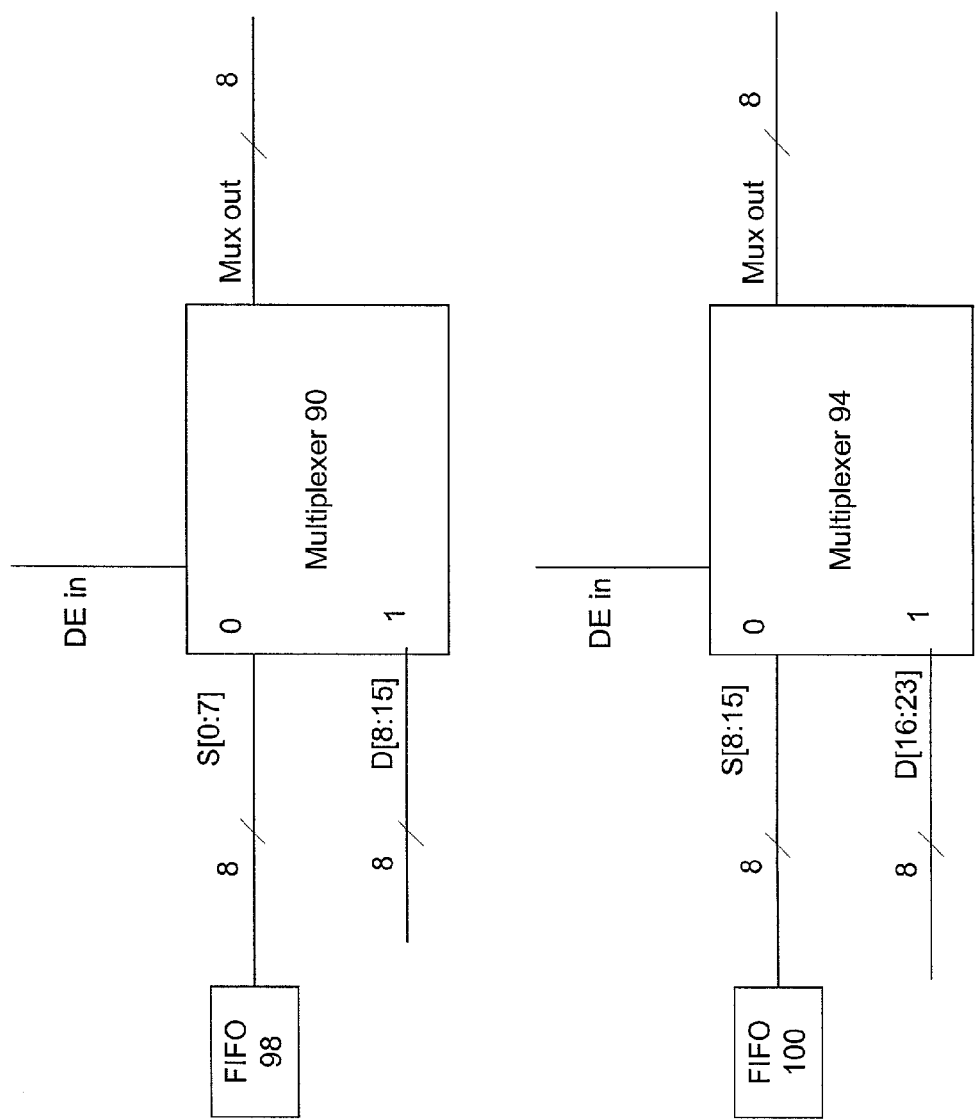
FIG. 2 illustrates the multiplexers of FIG. 1.

Given the VESA specifications, designers can alter a current TMDS link to transmit side channel data by altering redundant DEI signals to include side channel data. Referring to FIGS. 1 and 2, one embodiment of a transmitter 20 for sending side channel data according to the invention includes a FIFO 98 for storing side channel data for channel 1. The FIFO 98 provides side channel data S[0:7] to a first input of multiplexer 90. Data capture logic 22 can provide the side channel data to the FIFO 98 or the side channel data can be provided independent of the data capture logic 22. In addition, the data capture logic 22 provides video data DI[8:15] to a second input of multiplexer 90. $DE_{in}$, i.e., DEI, controls the multiplexer 90. When DEI is asserted the multiplexer 90 provides video data DI[8:15] to the encoder. When DEI is de-asserted, the multiplexer 90 provides side channel data S[0:7] to the encoder. FIFO 100 and multiplexer 94 perform the same function for channel 2 that FIFO 98 and multiplexer 92 perform for channel 1.

The transmitter also includes $DE_{out}$ control logic 92 for providing the $DE_{out}$ signal for channel 1. Data capture logic provides control 0, control 1 and DEI signals to the first, second, and third inputs, respectively, of $DE_{out}$ control logic 92. $DE_{out}$ control logic 96 performs the same functions for channel 2 that $DE_{out}$ control logic 92 performs for channel 1.

Figure 3A:
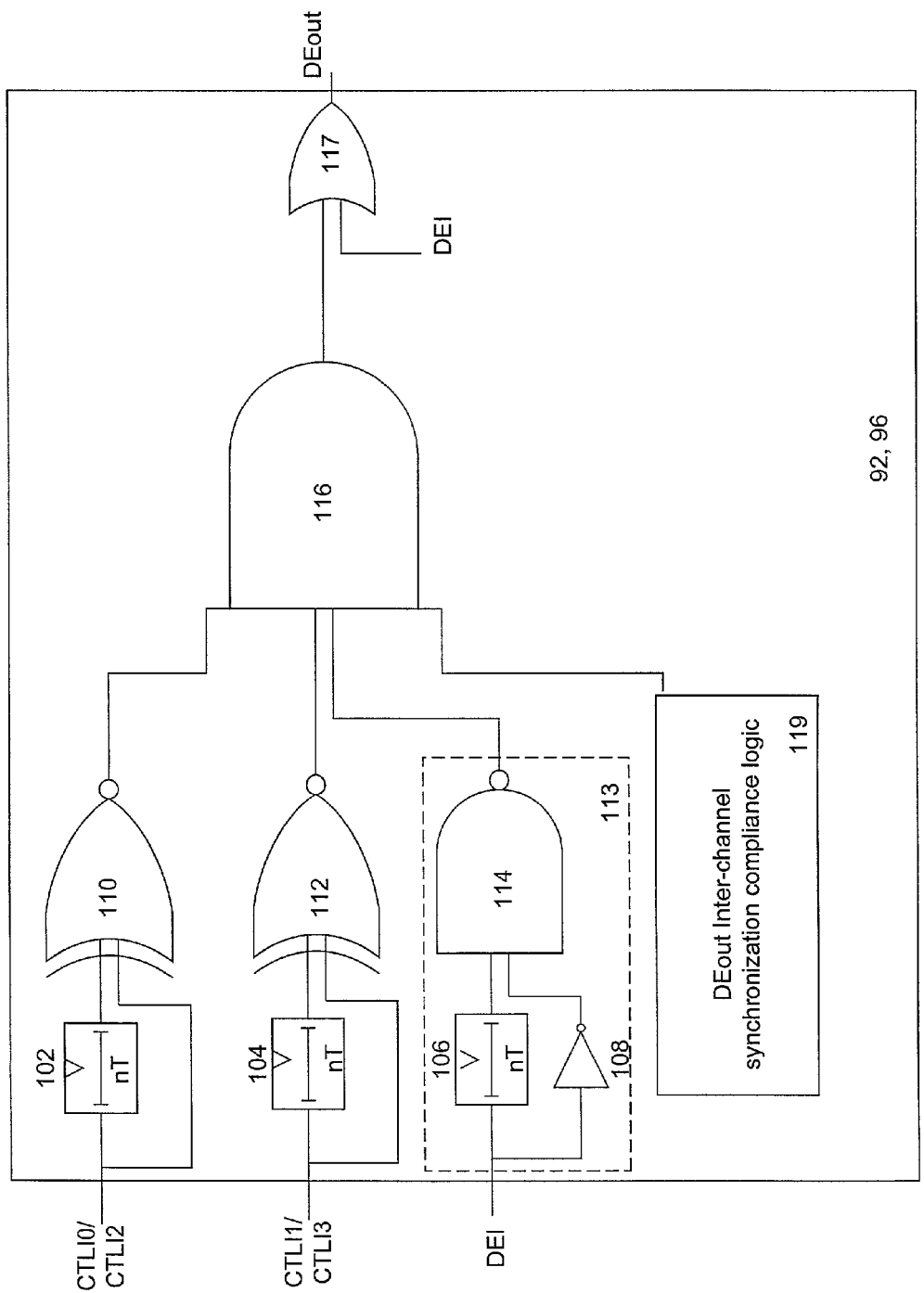
FIG. 3A is a schematic of one embodiment of the Data Enable out ($DE_{out}$) control logic of FIG. 1.

With reference to FIG. 3A depicting the $DE_{out}$ control logic 92, 96, control 0/2 signal is the first input to an XNOR gate 110. Control 0/2 signal, after passing through a delay circuit 102, is also the second input of the XNOR gate 110. The illustrated delay circuit produces a delay of duration nT, where T is the duration of one clock and n is an integer. Similarly, control 1/3 signal is the first input to an XNOR gate 112. Control 1/3 signal, after passing through a delay circuit 104, is also the second input of the XNOR gate 112.

For creating form 1 of $DE_{out}$ described above, the system includes optional logic 113. In this case, the DEI signal after passing through an inverter 108 is the first input to a NAND gate 114. DEI signal after passing through a delay circuit 106 is also the second input to the NAND gate 114. Again, the illustrated delay circuit 106 produces a delay of duration nT, where T is the duration of one clock and n is an integer. The integer n can be different for delay 102, delay 104, and delay 106. In one embodiment, the delay circuit 106 provides a delay of at least 10 clocks to facilitate phase tracking performed by a TMDS receiver.

Figure 3C:
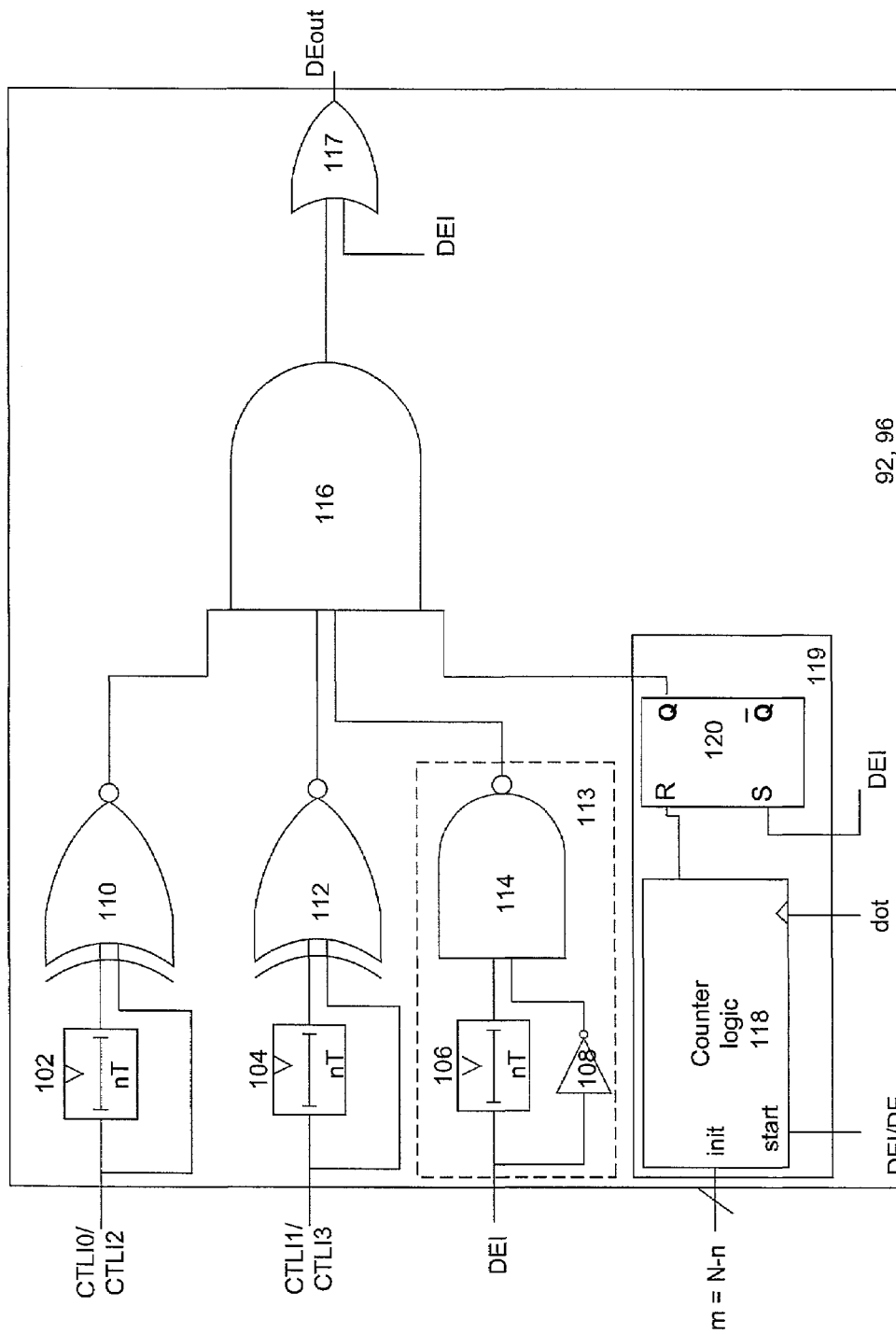
FIG. 3C is a schematic of another embodiment of the $DE_{out}$ control logic of FIG. 1.

Finally, with reference to FIGS. 3A and 3C, the $DE_{out}$ control logic 92, 96 includes $DE_{out}$ inter-channel synchronization compliance logic 119. In one embodiment, $DE_{out}$ inter-channel synchronization compliance logic 119 includes counter logic 118 and a RS flip-flop 120. The output of counter logic 118, fed by DEI or a delayed $DE_{in}$, i.e., a $DE_d$ signal, and a dot clock signal, provides an output to the set input of a RS flip-flop 120. Based on timings that are extracted from the DEI signal, the counter logic 118/RS flip-flop 120 combination generates a signal to predict the location of DEI rising edge. The $DE_{out}$ inter-channel synchronization compliance logic 119 can be based on a conventional "timing controller" design used for flat panel displays.

With reference to FIG. 3C, counter logic 118 extracts the required timings to predict the locations of the rising edges of DEI. The required timings could be programmed through either an external controller, or a PROM, or factory default values could be set at the time of design. For example, as shown in FIG. 3C, the counter logic an be initialized with a value m=N−n, where is the number of clicks in the horizontal time (horizontal time being the sum of a line data period and a horizontal blank period), and n is the number of clocks prior to the DEI rising edge at which the $DE_{out}$ signal goes low. The timings that need to be programmed or extracted are: 1) the length of a horizontal time; 2) the length of a vertical blank time (according to the VESA specification, this vertical blank time has to be an integer multiple of horizontal blank so that Hsync signal can be free-running with a fixed frequency and so the vertical blank is longer than one horizontal time); and 3) the number of horizontal times between two vertical blank periods.

A system can estimate horizontal time by counting the number of clocks between consecutive DE rising edges. If two consecutive lengths between DE rising edges turn out to be the same or within a small number of clocks of each other, e.g., if the difference is 2 clock periods, then the measured length can be assumed as the horizontal time. This assumption is valid because, for most display systems, the horizontal time is constant and there are at least two display lines per frame.

Once the system estimates the horizontal time, the system can count the number of horizontal times (not the length of the horizontal time) between vertical blank times. Vertical blank time can be identified since a vertical blank time is in general longer than a horizontal time. Since a horizontal blank is shorter than horizontal time (the sum of horizontal blank and a horizontal data time), vertical blank is longer than a horizontal blank time and this property makes detection of vertical blank, with respect to horizontal blank, possible. The system also estimates the length of the vertical blank time.

Once the system estimates all three values, the system estimates the location of the DEI rising edge using conventional methods. Since the system can predict the location of rising edge of DEI, it is also possible to generate edges that come earlier than the coming DEI rising edge.

Figure 10:
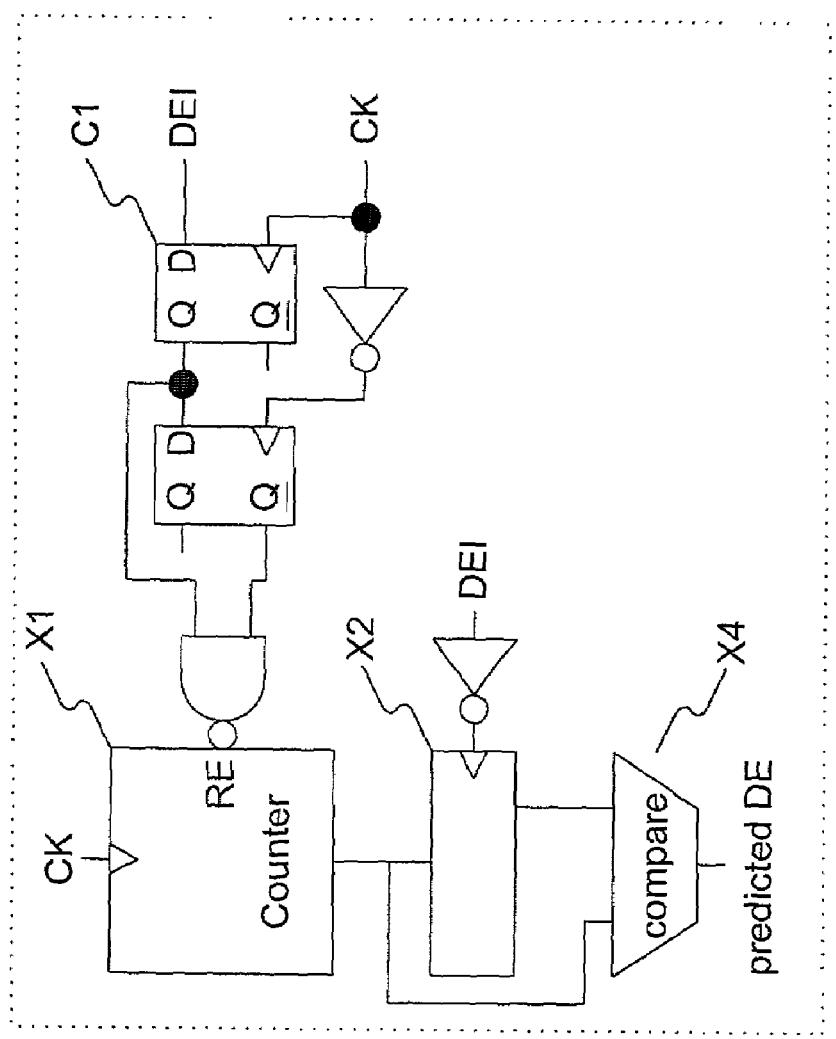
FIG. 10 is a schematic drawing of a portion of counter logic for use with the $DE_{out}$ control logic of FIG. 3C.

With reference to FIG. 10, one embodiment of the $DE_{out}$ inter-channel synchronization compliance logic 119 includes the following. A resettable counter, X1, that is reset at the falling edge of DE, has two inputs and an output data bus. The width of the output data bus depends on the number of bits for which the counter is implemented. The first input is the DEI to be used as reset. The second input is the dot-clock which is used for counting. An example embodiment of XZ1 can be a resettable 12 bit counter. This example covers most existing display systems.

The output bus of counter X1 is latched at the falling edge of DEI. Internally, the reset signal is applied right after the output bus is latched so that the signal does not violate the set-up time of the output latch. An array of latches for the output latching, X2, contains the horizontal time. In the subsequent DE periods, this value is used for comparison and this value is updated per every DE period except for the DE period representing the Vsync period.

The system can include a data comparator block X4 having two buses of inputs and one bit output. The first bus of input is from X2 and the second bus of input is from X1. The output is set (the level of set can be defined arbitrarily depending on the logic requirements) when both of the bus inputs coincide. Then the output of X4 can be used to predict DEI rising edge.

Figure 11:
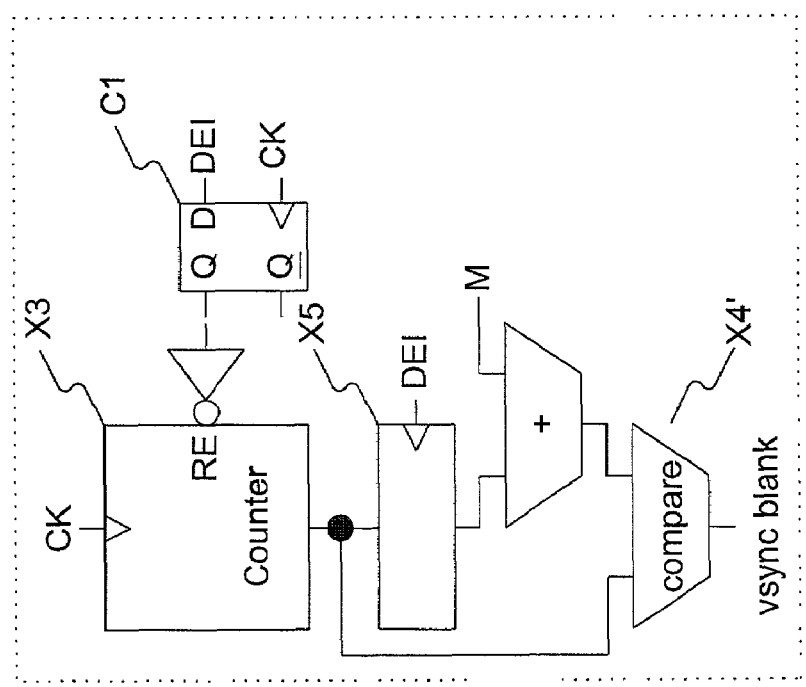
FIG. 11 is a schematic drawing of an additional portion of the counter logic of FIG. 10.

With reference to FIG. 11, another counter, X3, records the length of DE low period, detecting Vsync blank. Another array of latches, X5, latches the output of X3. A comparator X4' that compares X3 and X5 indicates if the blank is Vsync blank or not.

Figure 12:
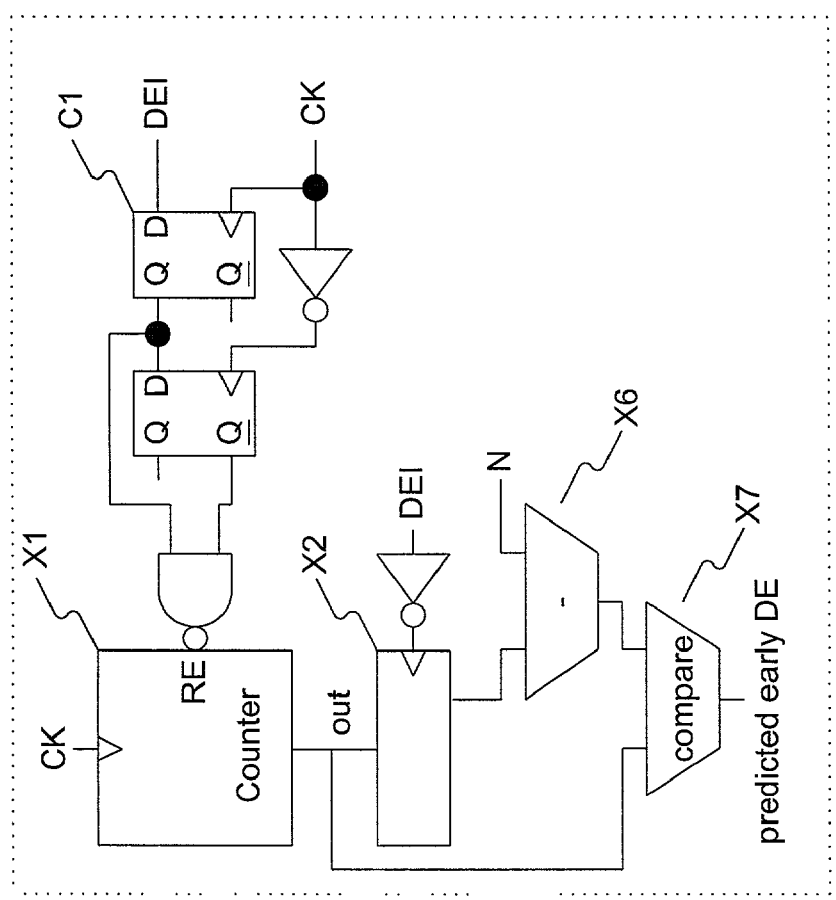
FIG. 12 is a schematic drawing of another additional portion of the counter logic of FIG. 10.

With reference to FIG. 12, a subtractor, X6, then assists in generating an edge earlier than the DE rising edge by n-clocks. The subtractor X6 has two buses of inputs and one bus of output. The first input is from X2. The second input is from the fixed integer value 'n'. This value can also be programmed by an external means or set by internal control or by internal/external default values. Then the output of X6 is the subtracted value between the first input and second input of X6. Another comparator X7 having a first input from X1 and a second input from X6, provides an output indicating the location of an edge that is n clocks earlier than the DE rising edge. Finally, with reference to FIG. 3C, the DEI signal passes to the reset input of the RS flip-flop 120.

In an alternative embodiment, all the input data streams, including the side-channel, could be fed through a FIFO, delaying the data by the number of cycles necessary to produce the appropriate blanking period before the rising edge of the primary data. According to this embodiment, when the rising edge of the primary data DE is detected, the blanking period is started. Then, when the delayed data reaches the input of the system, the correct blanking period will have been produced.

With reference to FIGS. 3A and 3C, the outputs of XNOR gate 110, XNOR gate 112, NAND gate 114, and $DE_{out}$ inter-channel synchronization compliance logic 119 are the inputs to the first, second, third, and fourth inputs of a four input AND gate 116. The output of the AND gate 116 and DEI signal are the inputs of a two input OR gate 117. The OR gate 117 prevents unwanted transition of $DE_{out}$ caused by erroneous transitions of control signal inputs during DEI high. The output of OR gate 117 is the DE signal, i.e., $DE_{out}$, that passes to the encoder, e.g., to the channel 1 or channel 2 encoder. The encoders 50A, 52A, 54A are conventional encoders, e.g., TMDS encoders, such as the encoders described in the above-noted U.S. Pat. No. 5,974,464 issued Oct. 26, 1999, entitled "System for High Speed Serial Video Signal Transmission Using DC-Balanced Coding." With reference to FIG. 1, the $DE_{out}$ signals, $DE_{out}1$ and $DE_{out}2$, also feed back to FIFOs 98, 100 and multiplexers 90, 94, respectively.

FIG. 3B shows the timeline relationship between a DEI signal, a control signal (e.g., control 0 or control 1), and a resulting $DE_{out}$ signal. With reference to FIGS. 3A and 3B, in one embodiment of the $DE_{out}$ control logic, the output of NAND 114 produces the first de-asserted period in $DE_{out}$ between times t0 and t1. This blank period in $DE_{out}$ facilitates phase tracking. The XNOR gates 110, 112, in response to transitions in one of the control signals, e.g., control 0 or control 1, also produce blank periods in $DE_{out}$, such as the illustrated second and third blank periods between times t2 and t3 and between times t4 and t5.

Finally, the $DE_{out}$ inter-channel synchronization compliance logic 119 produces the blank period in $DE_{out}$ between times t6 and t7. In one embodiment, the blank period between t6 and t7 is at least two clocks to facilitate inter-channel synchronization performed by a TMDS receiver. As noted above, video link designers can design the counter logic/RS flip-flop combination 118, 120 to produce a blank period of the appropriate length and placement in time by estimating the length of the variable but still predictable DEI blank period. In analog technology, the DEI period can experience length variation of as much as 2%. In digital display technology, only one or two clocks of variation can affect the display quality. Hence, when a system, e.g., the counter logic/RS flip flop combination 118, 120, compares DEI periods, the system should tolerate some variation in the DEI periods. As will be obvious to those of skill in the art, there can be numerous alternative embodiments for the function provided by $DE_{out}$ inter-channel synchronization compliance logic 119.

In an alternative embodiment of $DE_{out}$ control logic 92, 96, the DE low period for phase tracking occurs between t6 and t7 and not between t0 and t1. In this alternative embodiment, the channel 2 $DE_{out}$ control logic 96, using the control 2, control 3, and DEI signals as inputs, operates in the same way as the channel 1 $DE_{out}$ control logic just described. As will become clear below, because of $DE_{out}$ control logic, the encoders for channel 1 and channel 2 send side channel data when $DE_{out}$ is asserted, e.g., between times t1 and t2, t3 and t4, and t5 and t6.

Figure 6:
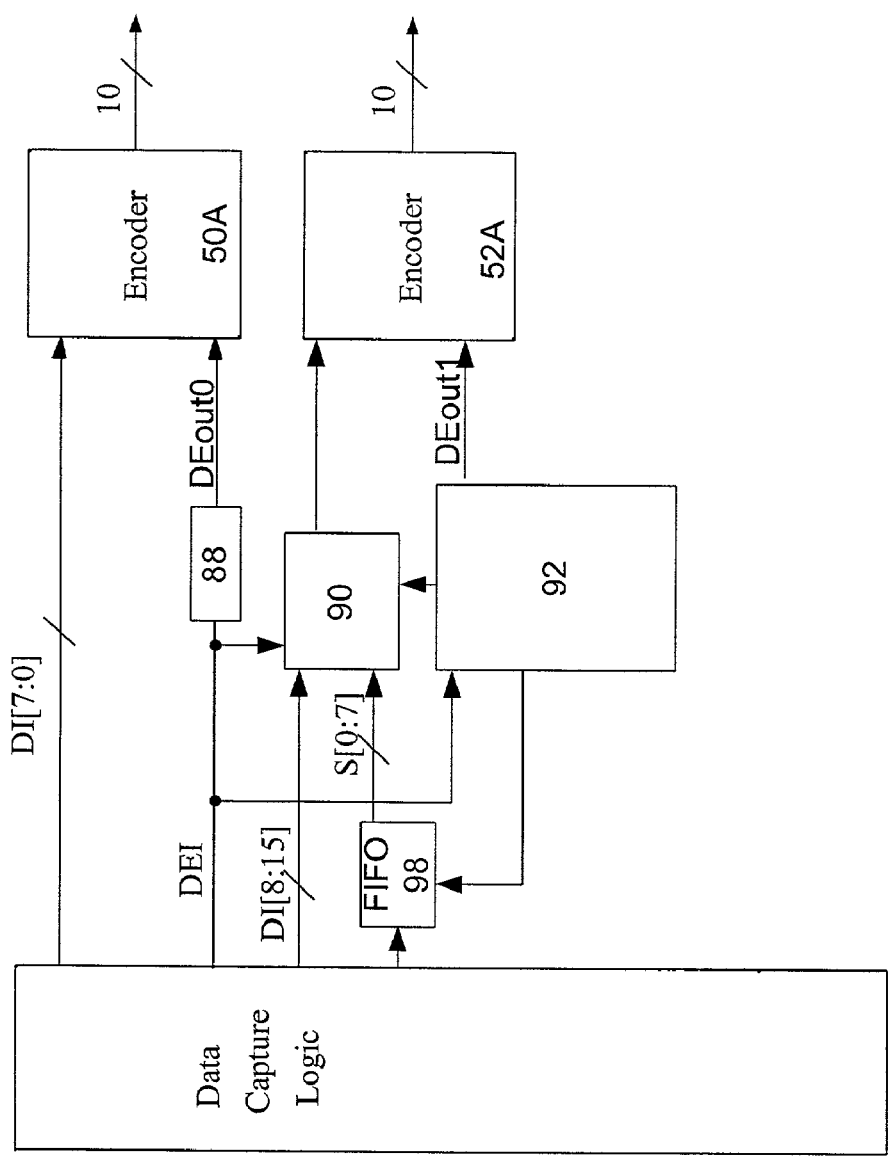
FIG. 6 illustrates an alternative embodiment of a transmitter according to the invention.

Turning now to the receiver of the TMDS link, as shown in FIG. 4, the receiver 60 recovers the video data, side-channel data, control signals and the DEI signal. The decoder 50B for channel 0 produces a recovered DE signal, i.e., $DE_{out}0$. Similarly, the decoders 52B, 54B for channels 1 and 2 produce recovered DE signals $DE_{out}1$ and $DE_{out}2$, respectively. $DE_{out}1$ represents the $DE_{out}$ signal produced by $DE_{out}$ logic block 92. Similarly, $DE_{out}2$ represents the $DE_{out}$ signal produced by $DE_{out}$ logic block 96. With reference to FIGS. 1 and 6, $DE_{out}0$ can be the product of a $DE_{out}0$ logic circuit 88 that has the DEI signal as the input or it can simply be the DEI signal. The $DE_{out}0$, $DE_{out}1$, and $DE_{out}2$ signals are the first, second, and third inputs to DEI signal and FIFO control signal recovery logic 199. Logic 199 passes the $DE_{out}0$, $DE_{out}1$, and $DE_{out}2$ signals to a three input AND gate 122. The output of AND gate 122 is DEI.

The output of AND gate 122 after passing through inverter 124 is the first input of AND gate 126. $DE_{out}1$ is the second input of AND gate 126. The output of AND gate 126 is a FIFO input control signal S1. S1 indicates when $DE_{out}$ is high but DEI is low. In other words, an asserted S1 signal indicates the transmission of said channel data over channel 1. Similarly, the output of inverter 124 is the first input of AND gate 128. $DE_{out}2$ is the second input of AND GATE 128. The output of AND gate 128 is a FIFO input control signal S2. An asserted S2 signal indicates the transmission of side channel data over channel 2. The AND gate 122, inverter 124, and AND gates 126 and 128 collectively form the DEI signal and FIFO control signal recovery logic 199.

Figure 5:
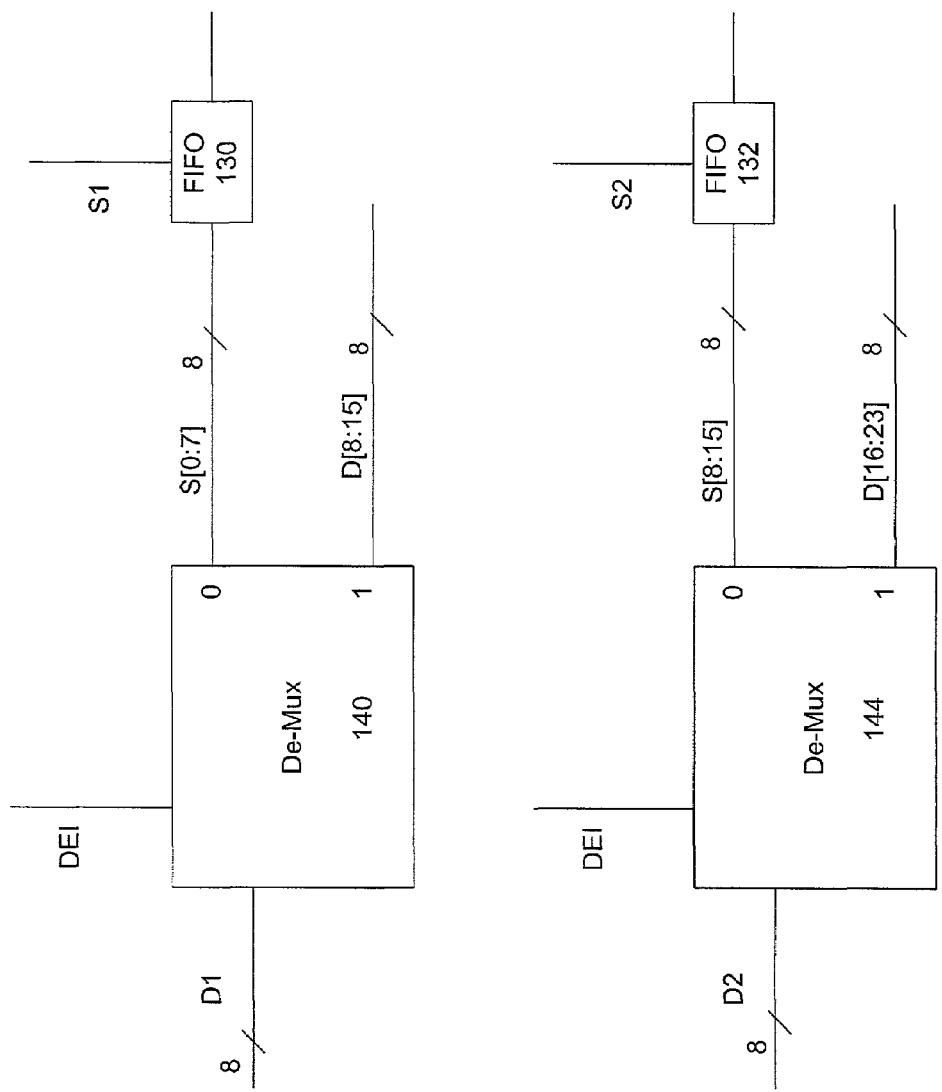
FIG. 5 illustrates de-multiplexers for receiving data from the decoders of FIG. 4.

Channel 1 and 2 decoders 52B, 54B also produce output data signals D1 and D2, respectively. These data signals include both primary, e.g., video, data and side channel data. With reference to FIG. 5, data signal D1 is the input to de-multiplexer 140. De-multiplexer 140, controlled by DEI, separates the primary data D[8:15] from the side channel data S[0:7]. Side channel data then pass to a FIFO 130 controlled by input control signal S1.

In the same manner, data signal D2 is the input to De-multiplexer 144. De-multiplexer 144 controlled by DEI separates the primary data D[16:23] from the side channel data S[8:15]. Side channel data S[8:15] then pass to a FIFO 132 controlled by input control signal S2. In this way, one embodiment of a receiver according to the present invention recovers side channel data transmitted over channels 1 and 2. As will be obvious to those skilled in the art, a high-speed digital transmission system according to the present invention can send side-channel data over an individual channel or over a combination of channels. Furthermore, techniques and systems according to the present invention can apply to a variety of high-speed digital communications links, e.g., links having two or more channels.

Figure 7:
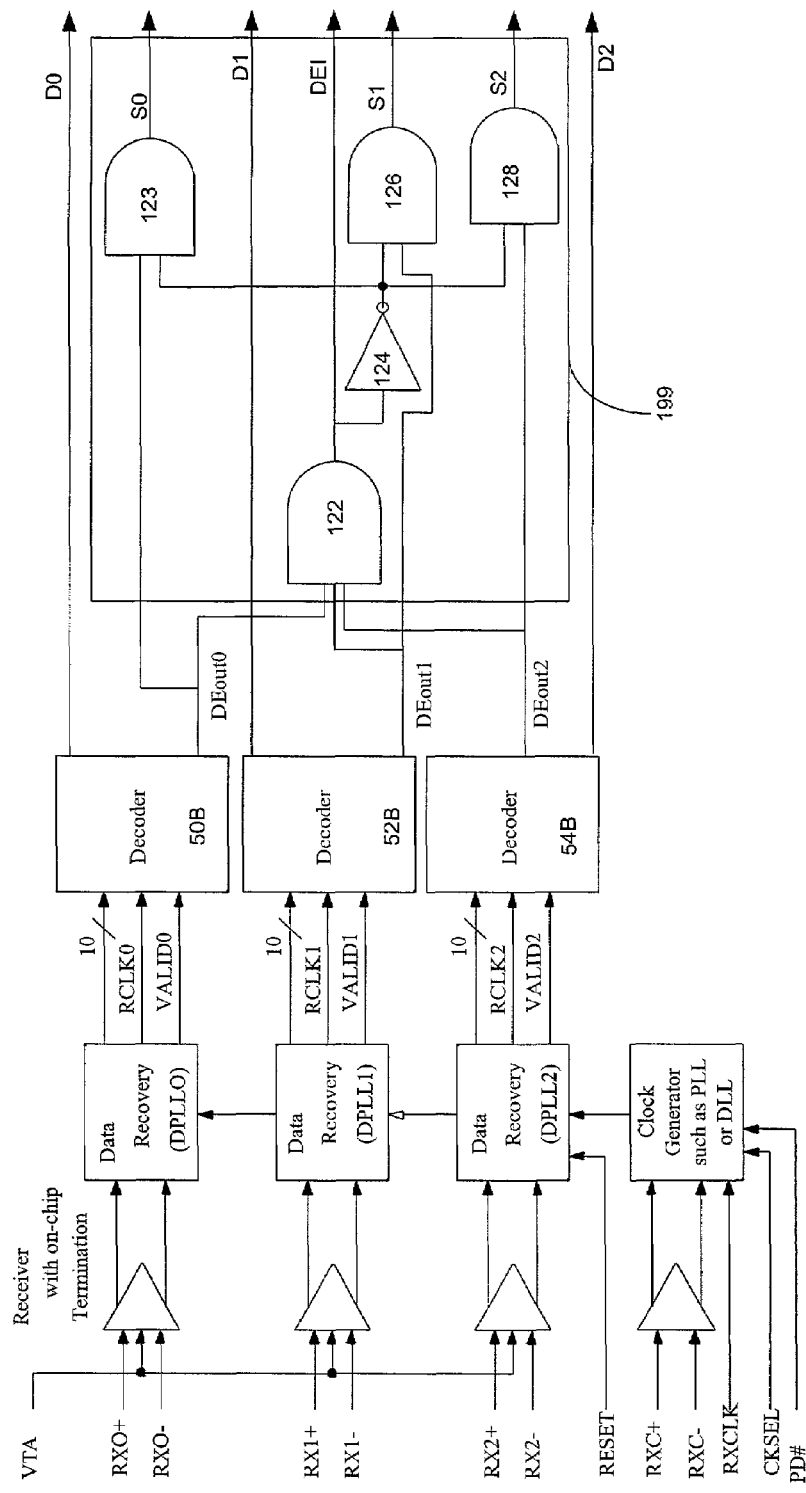
FIG. 7 illustrates an alternative embodiment of a receiver according to the invention.
Figure 8:
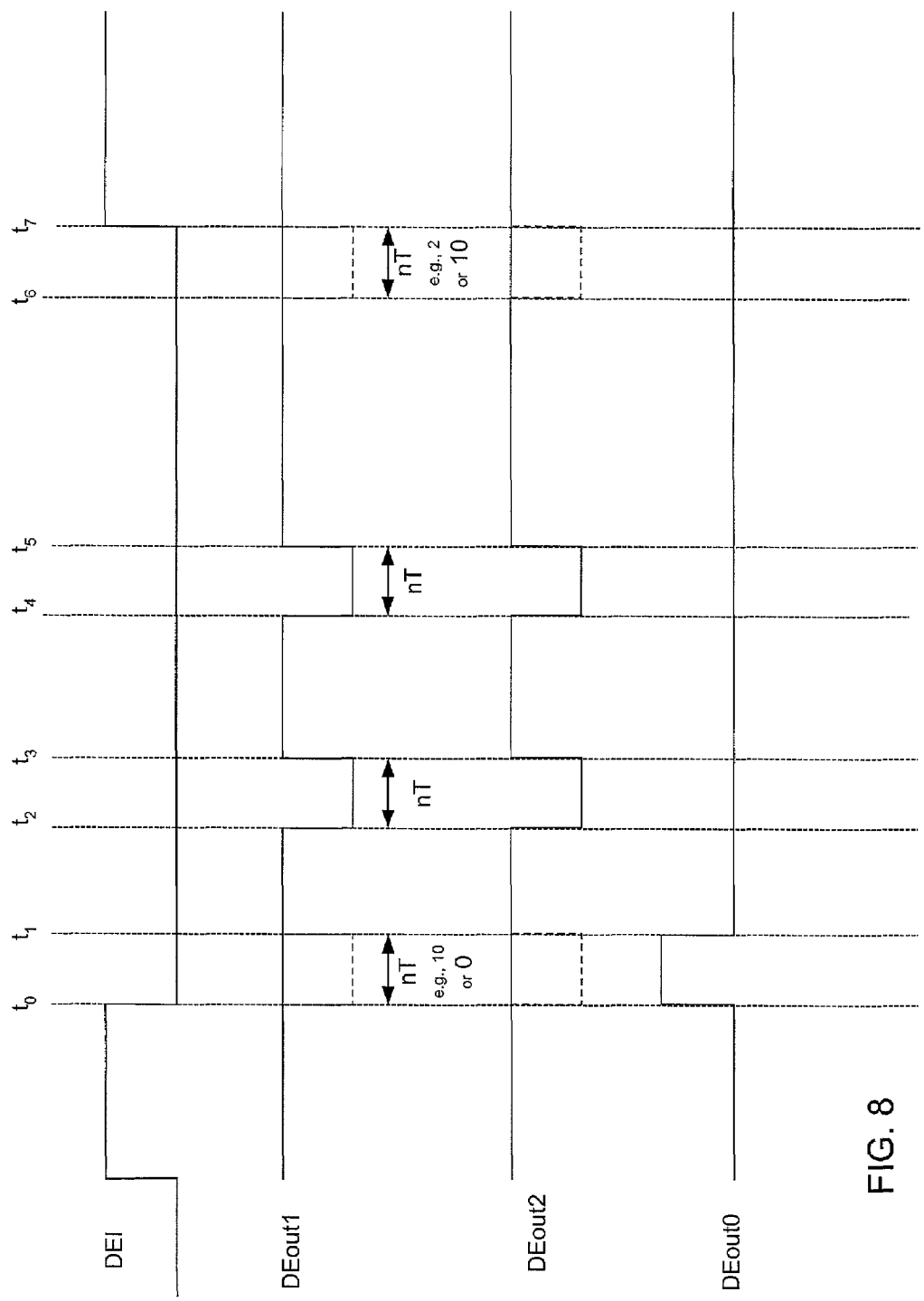
FIG. 8 illustrates the relationship between the DEI signal and the DEout signals for the receiver of FIG. 7.

The embodiment of a transmitter shown in FIG. 1 does not transmit side channel data over channel zero. However, with reference to FIGS. 7 and 8, as long as there is an AND gate 122 receiving each of the $DE_{out}$ signals, e.g., $DE_{out}0$, $DE_{out}1$, $DE_{out}2$, in the receiver, the final DEI will reflect the transmitted DEI and the transmission system will not jeopardize the primary data. In the event of transmission of side channel data over channel zero in addition to transmission of side channel data over channels one and two, one embodiment of a receiver according to the invention would include, with reference to FIGS. 4 and 7, an additional AND gate 123 having two inputs and an output. The first input receives the $DE_{out}0$ signal. The second input receives the output of inverter 124, and the output produces a FIFO control signal for a channel zero side channel FIFO. In addition, the data from the channel zero decoder D0 would go to a de-multiplexer similar to de-multiplexers 140 or 142.

Figure 9:
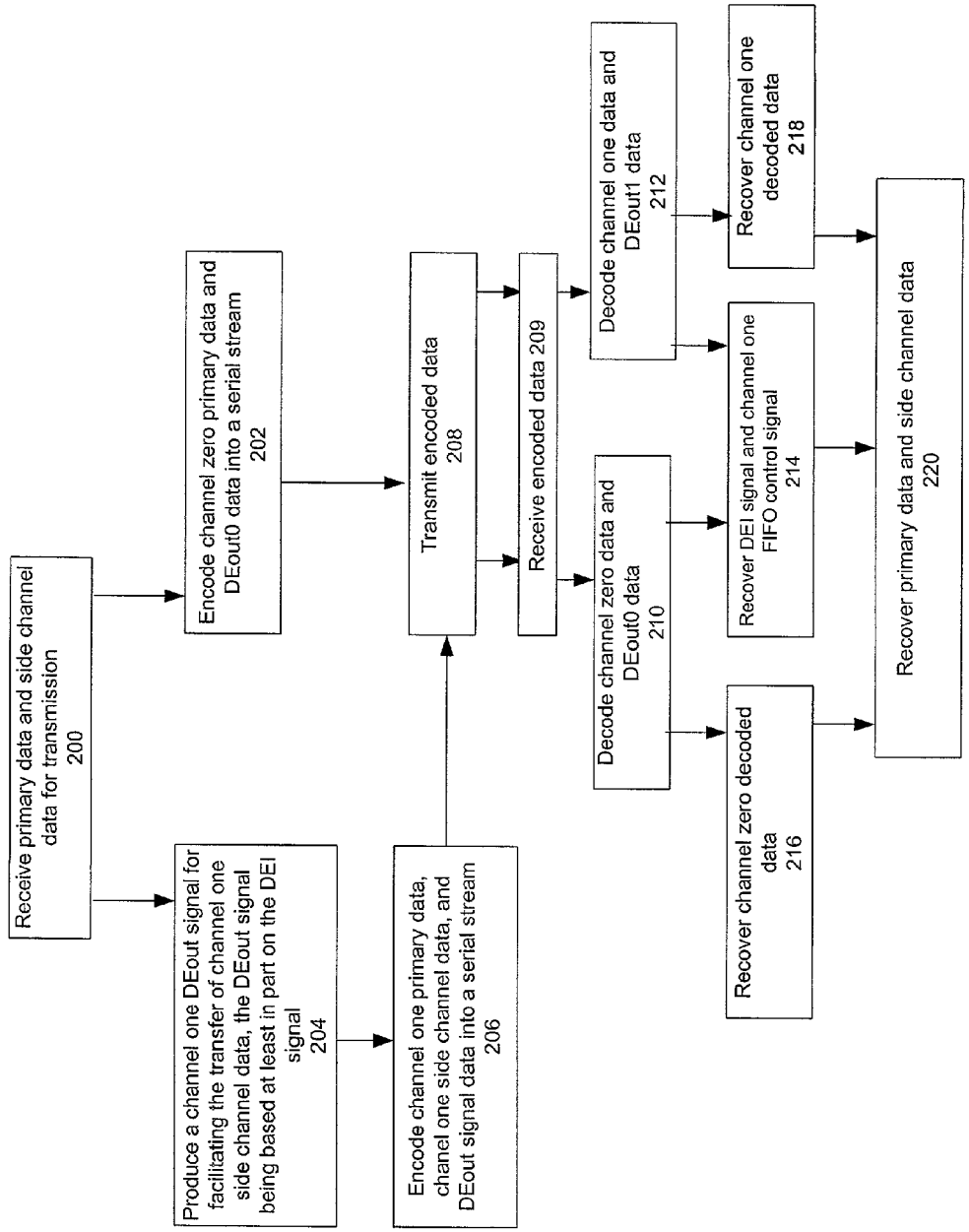
FIG. 9 is a flow chart illustrating the steps in one embodiment of a method according to the present invention.

In operation, and with reference to FIG. 9, a transmitter 20, according to one embodiment of the invention, first receives 200 primary data and side channel data for transmission. The transmitter 20 then encodes 202 channel zero primary data and $DE_{out}0$ data into a serial stream. The transmitter 20 also produces 204 a channel one $DE_{out}$ signal for facilitating the transfer of channel one side channel data. The channel one $DE_{out}$ signal is based, at least in part, on the DEI signal. The transmitter 20 then encodes channel one primary data, channel one side channel data, and $DE_{out}1$ signal data into a serial stream. Finally, the transmitter transmits 208 the encoded data over channel zero and channel one.

The receiver 60 then receives 209 the transmitted data and decodes 210 channel zero data and $DE_{out}0$ data. The receiver 60 also decodes 212 channel one data and $DE_{out}1$ data. The receiver 60 recovers 214 the DEI signal and a channel one FIFO control signal. The receiver 60 also recovers 216 channel zero and channel one decoded data, 218. Finally, the receiver 60 recovers 220 the primary data and the side channel data using the recovered channel zero data, the channel one data, the DEI signal and the channel one FIFO control signal. As described above, a de-multiplexer accomplishes the recovery of the primary data and the side channel data 220 according to one embodiment.

From the above description, it will be apparent that the invention disclosed herein provides a novel and advantageous system and method for sending side channel data over a high-speed digital communication link. Embodiments of the invention send side channel data while maintaining interoperability with legacy devices. One embodiment of the $DE_{out}$ control logic 92, 96 provides $DE_{out}$ signals with at least 10 clocks of data inactive period at the beginning of each DEI inactive period to facilitate phase tracking performed by TMDS receivers. In addition, this embodiment of the $DE_{out}$ control logic provides $DE_{out}$ signals with at least two clocks of data inactive period at the end of each DEI inactive period to facilitate inter-channel synchronization performed by TMDS receivers. Another embodiment of the $DE_{out}$ control logic 92, 96 provides $DE_{out}$ signals with at least 10 clocks of data inactive period at the end of each DEI inactive period to facilitate phase tracking and inter-channel synchronization performed by TMDS receivers. Finally, the $DE_{out}$ control logic 92, 96 provides $DE_{out}$ signals with low periods following transitions in control signals to facilitate the recovery of control signals by TMDS receivers.

One can configure an embodiment of the invention in which the 10 clock data inactive period is shorter or longer. A longer inactive period for resynchronization results in a more robust link. Hence, given a robust link that can sustain a low bit error rate with relatively short data inactive period, one can utilize more of the inactive period to obtain more bandwidth according to the invention. If the link is not relatively robust, by increasing the data inactive period it is possible to obtain the required bit error rate in the primary data channel. The length of the physical data inactive period can be determined during the design stage or can be configured at run time.

In one embodiment, channel 0 (blue channel) remains unaltered and channel 1 (green) and channel 2 (red) send side channel data. A video link according to the present invention can send a larger amount of side channel data than current links can send using control characters. In addition, receivers use control characters for data synchronization. Out-of-band characters in general serial communications are used for synchronization. In TMDS, for example, since the link extracts timing information from out of band characters that contain many transition edges, synchronization takes place mostly when out-of-band characters are transmitted. Thus, sending side channel data according to the systems and methods of the present invention, in contrast to using control characters, does not detract from the phase tracking process.

As a result, embodiments of the present invention provide better signal integrity than systems that transmit side channel data using control characters. More specifically, the synchronization operation that occurs in a TMDS link can result in the duplication or loss of some of the transmitted control characters. In this invention, since the side channel data is sent as data not as control characters, the loss or duplication associated with the synchronization operation does not occur. Thus, the present invention, advantageously reduces loss or duplication of side channel data relative to a method that uses control signals to transfer side channel data.

As noted above, the present invention is applicable to a variety of serial interface transmission systems having more than one data line where the transmission system encodes content data and data enable signal data using in-band and out-of-band characters. With reference to FIG. 6, an alternative embodiment of a transmitter according to the invention includes a data capture logic block, a FIFO 98, a multiplexer 90, channel one $DE_{out}$ control logic 92 and two data encoders, e.g., 50A, 52A. This embodiment does not encode control signals and uses two channels. Thus, with reference to FIG. 3A, the $DE_{out}$ Control logic 92 would not have control outputs, would not have delay elements 102, 104 and XNOR gates 110, 112. In addition, a transmitter can include channel zero $DE_{out}$ control logic 88 or can pass the DEI signal directly to encoder 50A.

In one application, a receiving system can use transmitted side channel to supply audio data to a speaker. Since the horizontal refresh rate is in the range of several tens of kHz, several words of buffer are enough to maintain the quality of service. In general, audio data does not require high bandwidth. For example, if the designed cut off frequency of an audio signal is 20 kHz, 40 kHz sampling would provide just enough Nyquist bandwidth. Assuming a system uses 20 bit resolution and assuming stereo takes exactly twice the data rate of monophonic, then the data rate is 1.6 Mbps. Since in the side channel a system according to the present invention can send 16 bits of information per clock, the system would need to send 100 Kwords/s. A typical horizontal time is around 20 us. This corresponds to around 50 kHz. Hence, the system needs just 2 words of FIFO to get the audio running continuously in this example.

In other applications, the side channel data can provide data to peripheral devices such as a joystick, a keyboard, a mouse, or a microphone.

The side channel data can have various sources such as a set top box, a conventional computer, a DVD player, a game console, or a camcorder. The receiver can also be located in a variety of products such as a conventional computer display, a television, or a projector.

The amount of data that one embodiment of a system according to the invention can send depends on the blank period ratio, which is usually between 2% and 20%, and on the type of display format involved. If the blank period ratio is 25% and the display format is ATSC 480i, a system according to the invention can send 144 bytes of side channel data per line if there is no transition in the control signals transferred through that specific channel during that blanking period and assuming the system provided 10 clock cycles of physical blanking period for receiver synchronization.

As noted above, methods according to embodiments of the invention preserve sync signal locations as if the side channel does not exist. However, embodiments of the present invention that do not encode Hsync and Vsync signals may not provide a constant data rate. The change of data rate is due to the parallel nature of Hsync and Vsync signals in a coded word. Since DEout has to be de-asserted regardless of whether both signals toggles at the same time or only one signal toggles at a time, the data rate can vary according to the relative locations of the transitions in those signals. In addition, the latency of the data transferred through the side channel provided by the methods in this invention, can also vary depending on the transition density of the control signals transferred. In cases where a guarantee of a constant data rate is a higher priority than video signal integrity (such as a video system that does not have any encryption scheme related to sync signal timing scrambling), an alternative embodiment of this invention can include encoding of Hsync and Vsync signals. In any case, since encoding of Hsync and Vsync signals is generally incompatible with the use of a legacy link, one should provide a procedure for checking the compatibility of a link prior to any data transmission.

In the description of the embodiments of the invention above, the designation of particular channels as channel 0, channel 1, and channel 2 is for ease of reference only. For example, one can refer to any channel that provides a legacy DE signal as channel 0.

According to one embodiment of the invention, one can design a receiver with relatively robust DE recovery logic. For example, the logic can include glitch filters. If a transmitter receives an indication of the existence of a relatively robust receiver through configuration methods such as Extended Display Identification Data (EDID) and Display Data Channel (DDC), the transmission system can send additional data through the channel that otherwise would carry the unaltered DE signal, e.g., channel 0, or it can assign the worst channel as the channel that will carry the unaltered DE signal because random errors will be filtered out by the relatively robust receiver.

According to one embodiment, the selection of which channel will carry the unaltered DE signal can be done at the time of design of the communication link or while the communication link is running. If this channel is selected while the communication link is running, the transmission system can select the channel based at least in part on communication between the transmitter and the receiver or one side can select the channel and communicate the selection to the other side. One method for selecting which channel will carry an unaltered DE signal includes the transmitter transmitting a known signal pattern over each channel so that the receiver can determine which channel is most suitable for sending the unaltered DE signal. The receiver can then communicate that information to the transmitter. If the transmitter can switch which channel will carry the unaltered DE signal, the transmitter confirms the selection.

The above description is included to illustrate the operation of the various embodiments of the present invention and is not meant to limit the scope of the invention. The scope of the invention is to be limited only by the following claims. From the above description, many variations will be apparent to one skilled in the art that would yet be encompassed by the spirit and scope of the invention.

What is claimed is:

1. A high speed digital transmitter capable of sending side channel data, the transmitting comprising:
a channel zero encoder having first and second inputs and an output, the first input receiving channel zero primary data, the second input receiving a channel zero $DE_{out}$ signal, and the output producing channel zero encoded data, the channel zero encoder operative to produce channel zero encoded data based at least in part on the channel zero primary data and the channel zero $DE_{out}$ signal;
a channel one multiplexer having at least first and second data inputs, at least one control input, and at least one output, the channel one multiplexer operative to multiplex channel one primary data and channel one side channel data, the first data input receiving channel one primary data, the control input receiving a DEI signal, and the output providing a multiplexed signal including channel one side channel data and channel one primary data;
a channel one $DE_{out}$ control logic having a first input and an output, the channel one $DE_{out}$ control logic operative to produce a channel one $DE_{out}$ signal for facilitating transfer of channel one side channel data, the first input receiving a DEI signal, and the output producing a channel one $DE_{out}$ signal; and
a channel one encoder having first and second inputs and an output, the first input receiving the output of the channel one multiplexer, the second input receiving the output of the channel one $DE_{out}$ control logic, the output producing channel one encoded data, the channel one encoder operative to produce channel one encoded data based at least in part on the first and second inputs.

2. The transmitter of claim 1, wherein the channel zero $DE_{out}$ signal is the DEI signal.

3. The transmitter of claim 1, wherein the channel zero encoder has third and fourth inputs for receiving Hsync and Vsync signals.

4. The transmitter of claim 1, wherein the transmitter further comprises:
a channel two multiplexer having at least first and second data inputs, a control input, and an output, the channel two multiplexer operative to multiplex channel two primary data and channel two side channel data, the first data input receiving channel two primary data, the second data input receiving channel two side channel data, the control input receiving a DEI signal, and the output providing channel two side channel data or channel two primary data depending on the value of the DEI signal;
a channel two $DE_{out}$ control logic having an input and an output, the channel two $DE_{out}$ control logic operative to produce a channel two $DE_{out}$ signal for facilitating the transfer of channel two side channel data, the first input receiving a DEI signal, and the output producing a channel two $DE_{out}$ signal; and
a channel two encoder having first and second inputs and an output, the first input receiving the output of the channel two multiplexer, the second input receiving the output of the channel two $DE_{out}$ control logic, the output producing channel two encoded data, the channel two encoder operative to produce channel two encoded data based at least in part on the first and second inputs.

5. The transmitter of claim 1, wherein the transmitter further comprises:
a channel one FIFO having an input for receiving channel one side channel data and an output coupled to the second data input of the channel one multiplexer, the output providing channel one side channel data to the channel one multiplexer.

6. The transmitter of claim 1, wherein the channel one encoder has third and fourth inputs, the third input receiving a first control signal and the fourth input receiving a second control signal, and
wherein the channel one $DE_{out}$ control logic has second and third inputs, the second input receiving the first control signal, and the third input receiving the second control signal.

7. The transmitter of claim 6, wherein the channel one $DE_{out}$ control logic comprises:
a first control signal transition indication logic having an input and an output, the input adapted to receive the first control signal, the output providing a de-asserted signal as a result of transition in the first control signal;
a second control signal transition indication logic having an input and an output, the input adapted to receive the second control signal, the output providing a de-asserted signal as a result of a transition in the second control signal;
a $DE_{out}$ inter-channel synchronization compliance logic having an input and an output, the input adapted to receive the DEI signal, the output providing a de-asserted period of a preselected length and at a preselected location relative to a de-asserted period in the DEI signal; and
an AND gate having first, second and third inputs and an output, the first input being coupled to the output of the first control signal transition indication logic, the second input being coupled to the output of the second control signal transition indication logic, the third input being coupled to the output of the $DE_{out}$ inter-channel synchronization compliance logic, the output providing a digital visual interface compliant $DE_{out}$ signal.

8. The transmitter of claim 7, wherein the first control signal transition indication logic comprises:
a first delay element having an input and an output, the input adapted to receive the first control signal, the output producing a first delayed control signal;
a first logic gate having first and second inputs and an output, the first logic gate providing a de-asserted signal as a result of a transition of the first control signal, the first input coupled to the output of the first delay element, the second input adapted to receive the first control signal; and
wherein the second control signal transition indication logic comprises
a second delay element having an input and an output, the input adapted to receive the second control signal, the output producing a second delayed control signal;
a second logic gate having first and second inputs and an output, the second logic gate providing a de-asserted signal as a result of a transition of the second control signal, the first input coupled to the output of the second delay element, the second input adapted to receive the second control signal.

9. The transmitter of claim 7, wherein the channel one DEout control logic further comprises:
a phase-tracking compliance logic having an input and an output, the input adapted to receive the DEI signal, the output providing a de-asserted signal as a result of a transition in the DEI signal.

10. The transmitter of claim 9, wherein the phase tracking compliance logic comprises:
a delay element having an input and an output, the input adapted to receive the DEI signal, the output producing a delayed DEI signal;
an inverter having an input and an output, the input adapted to receive the DEI signal, and the output producing an inverted DEI signal; and
a NAND gate having first and second inputs and an output, the first input coupled to the output of the delay element, the second input coupled to the output of the inverter, the output producing a low period as a result of a transition from high to low in the DEI signal.

11. A high-speed digital receiver capable of receiving side channel data, the receiver comprising:
a channel zero decoder having a first input and second outputs, the first input receiving channel zero encoded data, the first output producing a channel zero decoded data signal, the second output producing a channel zero $DE_{out}$ signal, the channel zero decoder operative to produce channel zero decoded data and a channel zero $DE_{out}$ signal from the channel zero encoded data;
a channel one decoder having at least an input and first and second outputs, the first input receiving channel one encoded data, the first output producing channel one decoded data, the second output producing a channel one $DE_{out}$ signal, the channel one decoder operative to produce channel one decoded data and a channel one $DE_{out}$ signal from the channel one encoded data;
a DEI signal and a FIFO control signal recovery logic having first and second inputs and first and second outputs, the first input receiving the channel zero $DE_{out}$ signal, the second input receiving the channel one $DE_{out}$ signal, the DEI signal and FIFO control signal recovery logic operative to derive a DEI signal, the first output producing a DEI signal, the second output producing a first FIFO control signal; and
a channel one de-multiplexer having a data input, a control input, and first and second outputs, the channel one de-multiplexer operative to separate channel one decoded data into channel one primary data and channel one side channel data, the data input receiving channel one decoded data from the channel one decoder, the control input receiving the DEI signal from the DEI signal and FIFO control signal recovery logic, the first output producing channel one side channel data, and the second output producing channel one primary data.

12. The receiver of claim 11, wherein the receiver further comprises:
a channel two decoder having at least one input and at least first and second outputs, the first input receiving channel two encoded data, the first output producing channel two decoded data, the second output producing a channel two $DE_{out}$ signal, the channel two decoder operative to produce channel two decoded data and a channel two $DE_{out}$ signal from the channel two encoded data;
a channel two de-multiplexer having a data input, a control input, and first and second outputs, the channel two de-multiplexer operative to separate channel two decoder data into channel two primary data and channel two side channel data, the data input receiving channel two decoded data from the channel two decoder, the control input receiving the DEI signal from the DEI signal and FIFO control signal recovery logic, the first output producing channel two side channel data, and the second output producing channel two primary data.

13. The receiver of claim 12, wherein the DEI signal and FIFO control signal recovery logic comprises:
    a first AND gate having first, second and third inputs and an output, the first input adapted to receive the channel zero $DE_{out}$ signal from the channel zero decoder, the second input adapted to receive the channel one $DE_{out}$ signal from the channel one decoder, the third input adapted to receive the channel two $DE_{out}$ signal from the channel two decoder, the output providing the DE signal;
    an inverter having an input and an output, the input coupled to the output of the first AND gate to receive the DEI signal, the output providing an inverted DEI signal;
    a second AND gate having first and second inputs and an output, the first input coupled to the output of the inverter to receive the inverted DEI signal, the second input adapted to receive the channel one $DE_{out}$ signal from the channel one decoder, the output providing a channel one FIFO control signal; and
    a third AND gate having first and second inputs and an output, the first input coupled to the output of the inverter to receive the inverted DEI signal, the second input adapted to receive the channel two $DE_{out}$ signal from the channel two decoder, the output providing a channel two FIFO control signal.

14. The receiver of claim 13, wherein the receiver further comprises:
    a channel one FIFO having a data input, a control input and an output, the data input coupled to the first output of the channel one de-multiplexer, the control input adapted to receive the channel one FIFO control signal from the second AND gate, and the output providing channel one side channel data; and
    a channel two FIFO having a data input, a control input and an output, the data input coupled to the first output of the channel two de-multiplexer, the control input adapted to receive the channel two FIFO control signal from the third AND gate, and the output providing channel two side channel data.

15. A method for sending side channel data, the method comprising:
    encoding channel zero primary data for transmission using a channel zero encoder having first and second inputs and one output, the first input receiving channel zero primary data, the second input receiving a channel zero $DE_{out}$ signal, and the output producing channel zero encoded data, the channel zero encoder operative to produce channel zero encoded data based at least in part on the channel zero primary data and the channel zero $DE_{out}$ signal;
    multiplexing channel one primary data and channel one side channel data using a channel one multiplexer having first and second data inputs, a control input, and an output, the first data input receiving channel one primary data, the second data input receiving channel one side channel data, the control input receiving a DEI signal, and the output providing channel one side channel data or channel one primary data depending on the value of the DEI signal;
    producing a channel one $DE_{out}$ signal from facilitating transfer of channel one side channel data using channel one $DE_{out}$ control logic having an input and an output, the first input receiving a DEI signal, and the output producing a channel one $DE_{out}$ signal; and
    encoding channel one data for transmission using a channel one encoder having first and second inputs and an output, the first input receiving the output of the channel one multiplexer, the second input receiving the output of the channel one $DE_{out}$ control logic, the output producing channel one encoded data based at least in part on the two inputs.

16. A method for receiving side channel data, the method comprising:
    receiving channel zero encoded data and channel one encoded data;
    decoding channel zero encoded data using a channel zero decoder having a first input and first and second outputs, the first input receiving channel zero encoded data, the first output producing a channel zero decoded data signal, the second output producing a channel zero $DE_{out}$ signal;
    decoding channel one encoded data using a channel one decoder having at least an input and first and second outputs, the first input receiving channel one encoded data, the first output producing channel one decoded data, the second output producing a channel one $DE_{out}$ signal;
    deriving a DEI signaling using a DEI signal and FIFO control signal recovery logic having first and second inputs and first and second outputs, the first input receiving the channel zero $DE_{out}$ signal, the second input receiving the channel one $DE_{out}$ signal, the first output producing a DEI signal, the second output producing a first FIFO control signal; and
    separating channel one decoded data from channel one side channel data using a channel one de-multiplexer having a data input, a control input, and first and second outputs, the data input receiving channel one decoded data from the channel one decoder, the control input receiving the DEI signal from the DEI signal and FIFO control signal recovery logic, the first output producing channel one side channel data, and the second output producing channel one primary data.

17. A high speed digital transmission system capable of sending side channel, the system comprising:
    a transmitter having first and second outputs,
    a receiver having first and second inputs,
    a channel zero connecting the first output of the transmitter to the first input of the receiver, and
    a channel one connecting the second output of the transmitter to the second input of the receiver;
    wherein the transmitter comprises: a channel zero encoder having first and second inputs an output, the first input receiving channel zero primary data, the second input receiving a channel zero $DE_{out}$ signal, and the output producing channel zero encoded data, the channel zero encoder operative to produce channel zero encoded data based at least in part on the channel zero primary data and the channel zero $DE_{out}$ signal;
    a channel one multiplexer having first and second data inputs, a control input, and an output, the channel one multiplexer operative to multiplex channel one primary data and channel one side channel data, the first data input receiving channel one primary data, the second data input receiving channel one side channel data, the control input receiving a DEI signal, and the output providing channel one side channel data or channel one primary data depending on the value of the DEI signal;

a channel one $DE_{out}$ control logic having an input and an output, the channel one $DE_{out}$ control logic operative to produce a channel one $DE_{out}$ signal for facilitating transfer of channel one side channel data, the first input receiving a DEI signal, and the output producing a channel one $DE_{out}$ signal; and a channel one encoder having two inputs and one output, the first input receiving the output of the channel one multiplexer, the second input receiving the output of the channel one $DE_{out}$ control logic, the output producing channel one encoded data the channel one encoder operative to produce channel one encoded data based at least in part on the two inputs; and wherein the receiver comprises: a channel zero decoder having an input and first and second outputs, the first input receiving channel zero encoded data, the first output producing a channel zero decoded data signal, the second output producing a channel zero $DE_{out}$ signal, the channel zero decoder operative to produce channel zero decoded data and a channel zero $DE_{out}$ signal from the channel zero encoded data;

a channel one decoder having at least one input and at least first and second outputs, the first input receiving channel one encoded data, the first output producing channel one decoded data, the second output producing a channel one DEout signal, the channel one decoder operative to produce channel one decoded data and a channel one $DE_{out}$ signal from the channel one encoded data;

a DEI signal and a FIFO control signal recovery logic having first and second inputs and first and second outputs, the first input receiving the channel zero $DE_{out}$ signal, the second input receiving the channel one $DE_{out}$ signal, the DEI signal and FIFO control signal recovery logic operative to derive a DEI signal, the first output producing a DEI signal, the second output producing a first FIFO control signal; and a channel one de-multiplexer having a data input, a control input, and first and second outputs, the channel one de-multiplexer operative to separate channel one decoded data into channel one primary data and channel one side channel data, the data input receiving channel one decoded data from the channel one decoder, the control input receiving the DEI signal from the DEI signal and FIFO control signal recovery logic, the first output producing channel one side channel data, and the second output producing channel one primary data.

18. A high-speed digital transmitter capable of sending side channel data, the transmitter comprising:

a channel zero encoder means for producing channel zero encoded data, said channel zero encoder means having first and second inputs and an output, the first input receiving channel zero primary data, the second input receiving a channel zero $DE_{out}$ signal, and the output producing channel zero encoded data based at least in part on the channel zero primary data and the channel zero $DE_{out}$ signal;

a channel one multiplexing means for multiplexing channel one primary data and channel one side channel data, said channel one multiplexing means having first and second data inputs, a control input, and an output, the first data input receiving channel one primary data, the second data input receiving channel one side channel data, the control input receiving a DEI signal, and the output providing channel one side channel data or channel one primary data depending on the value of the DEI signal;

a channel one $DE_{out}$ control logic means for producing a channel one $DE_{out}$ signal for facilitating transfer of channel one side channel data, said channel one $DE_{out}$ control logic means having an input and an output, the first input receiving a DEI signal, and the output producing a channel one $DE_{out}$ signal; and a channel one encoding means for producing channel one encoded data, said channel one encoding means having first and second inputs and an output, the first input receiving the output of the channel one multiplexer, the second input receiving the output of the channel one $DE_{out}$ control logic, the output producing channel one encoded data based at least in part on the two inputs.

19. The transmitter of claim 18, wherein the channel zero encoder means has third and fourth inputs receiving Hsync and Vsync signals.

20. The transmitter of claim 18, wherein the transmitter further comprises:

a channel one FIFO having an input for receiving channel one side channel data and an output coupled to the second data input of the channel one multiplexing means, the output providing channel one side channel data to the multiplexing means.

21. A high-speed digital receiver capable of receiving side channel data, the receiver comprising:

a channel zero decoder means for producing channel zero decoder data and a channel zero $DE_{out}$ signal, said channel zero decoder means having an input and first and second outputs, the first input receiving channel zero encoded data, the first output producing a channel zero decoded data signal the second output producing a channel zero $DE_{out}$ signal;

a channel one decoder means for producing channel one decoded data and a channel one $DE_{out}$ signal, said channel one decoder means having at least one input and at least first and second outputs, the first input receiving channel one encoded data, the first output producing channel one decoded data, the second output producing a channel one $DE_{out}$ signal;

DEI signal and FIFO control signal recovery logic means for deriving a DEI signal, said DEI signal and FIFO control signal recovery logic means having first and second inputs and first and second outputs, the first input receiving the channel zero $DE_{out}$ signal, the second input receiving the channel one $DE_{out}$ signal, the first output producing a DEI signal, the second output producing a first FIFO control signal, and a de-multiplexing means for separating a data signal into channel one primary data and channel one side channel data, said de-multiplexing means having a data input, a control input, and first and second outputs, the data input receiving channel one decoded data from the channel one decoder, the control input receiving the DEI signal from the DEI signal and FIFO control signal recovery logic, the first output producing channel one side channel data, and the second output producing channel one primary data.

22. A method or sending side channel data over a communication link having a transmitter, a receiver, and at least a channel zero and a channel one connecting the transmitter and the receiver, the method comprising:

encoding channel zero primary data, and DEI data for transmission on channel zero;

deriving a channel one $DE_{out}$ signal using channel one $DE_{out}$ control logic having an input and an output, a first input receiving a DEI signal, and the output producing a channel one $DE_{out}$ signal for facilitating transfer of channel one side channel data;

encoding channel one primary data channel one side channel data, and $DE_{out}$ signal data for transmission on channel one.

23. The method of claim 22, wherein the method further comprises:

selecting which channel will carry a substantially unaltered DE signal based on a characterization of the channels.

24. The method of claim 22, wherein the method further comprises:

communicating the capabilities of a receiver to a transmitter through a handshake procedure.

25. The method of claim 22, wherein deriving a channel one $DE_{out}$ signal comprises:

adjusting the length on a data inactive period within the channel one $DE_{out}$ signal based on a characterization of the channel.

26. A high-speed digital transmitter capable of sending side channel data, the transmitter comprising:

a channel zero encoder having first, second, third and fourth inputs and an output, the first input receiving channel zero primary data, the second input receiving a DEI signal, the third input receiving an Hsync signal, the fourth input receiving a Vsync signal, and the output producing channel zero encoded data, the channel zero encoder operative to produce channel zero encoded data based at least in part on the channel zero primary data, the DEI signal, the Hsync signal, and the Vsync signal;

a channel one FIFO having an input for receiving channel one side channel data and an output for providing channel one side channel data;

a channel one multiplexer having at least first and second data inputs, at least one control input, and at least one output, the channel one multiplexer operative to multiplex channel one primary data and channel one side channel data, the first data input receiving channel one primary data, the second data input coupled to the output of the channel one FIFO for receiving channel one side channel data, the control input receiving a DEI signal, and the output providing a multiplexed signal including channel one side channel data and channel one primary data;

channel one $DE_{out}$ control logic having a first input and an output, channel one $DE_{out}$ control logic operative to produce a channel one $DE_{out}$ signal for facilitating transfer of channel one side channel data, the first input receiving a DEI signal, and the output producing a channel one $DE_{out}$ signal; and a channel one encoder having first and second inputs and an output, the first input receiving the output of the channel one multiplexer, the second input receiving the output of the channel one $DE_{out}$ control logic, the output producing channel one encoded data, the channel one encoder operative to produce channel one encoded data based at least in part on the first and second inputs.

27. A high-speed digital receiver capable of receiving side channel data, the receiver comprising:

a channel zero decoder having a first input and first and second outputs, the first input receiving channel zero encoded data, the first output producing a channel zero decoded data signal, the second output producing a channel zero $DE_{out}$ signal, the channel zero decoder operative to produce channel zero decoded data and a channel zero $DE_{out}$ signal from the channel zero encoded data;

a channel one decoder having at least an input and first and second outputs, the first input receiving channel one encoded data, the first output producing channel one decoded data, the second output producing a channel one $DE_{out}$ signal, the channel one decoder operative to produce channel one decoded data and a channel one $DE_{out}$ signal from the channel one encoded data;

a DEI signal and a FIFO control signal recovery logic having first and second inputs and first and second outputs, the first input receiving the channel zero $DE_{out}$ signal, the second input receiving the channel one $DE_{out}$ signal, the DEI signal and FIFO control signal recovery logic operative to derive a DEI signal, the first output producing a DEI signal, the second output producing a first FIFO control signal, wherein the DEI signal and FIFO control signal recovery logic comprises:

a first AND gate having first, second and third inputs and an output, the first input adapted to receive the channel zero $DE_{out}$ signal from the channel zero decoder, the second input adapted to receive the channel one $DE_{out}$ signal from the channel one decoder, the third input adapted to receive the channel two $DE_{out}$ signal from the channel two decoder, the output providing the DEI signal;

an inverter having an input and an output, the input coupled to the output of the first AND gate to receive the DEI signal, the output providing an inverted DEI signal;

a second AND gate having first and second inputs and an output, the first input coupled to the output of the inverter to receive the inverted DEI signal, the second input adapted to receive the channel one $DE_{out}$ signal from the channel one decoder, the output providing a channel one FIFO control signal; and a third AND gate having first and second inputs and an output, the first input coupled to the output of the inverter to receive the inverted DEI signal, the second input adapted to receive the channel two $DE_{out}$ signal from the channel two decoder, the output providing a channel two FIFO control signal, and a channel one de-multiplexer having a data input, a control input, and first and second outputs, the channel one de-multiplexer operative to separate channel one decoded data into channel one primary data and channel one side channel data, the data input receiving channel one decoded data from the channel one decoder, the control input receiving the DEI signal from the DEI signal and FIFO control signal recovery logic, the first output producing channel one side channel data, and the second output producing channel one primary data.

* * * * *